(12) United States Patent
Kato et al.

(10) Patent No.: US 7,864,358 B2
(45) Date of Patent: Jan. 4, 2011

(54) IMAGE DATA CONTROL DEVICE, IMAGE DATA CONTROL PROGRAM, COMPUTER READABLE RECORDING MEDIUM ON WHICH THE PROGRAM IS STORED, IMAGE FORMING DEVICE, AND IMAGE READING DEVICE

(75) Inventors: Hiroshi Kato, Tokyo (JP); Hideki Sasaki, Fuchu (JP); Toshihiko Tanaka, Tokyo (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 998 days.

(21) Appl. No.: 10/346,098

(22) Filed: Jan. 17, 2003

(65) Prior Publication Data

US 2004/0075865 A1    Apr. 22, 2004

(30) Foreign Application Priority Data

Oct. 18, 2002    (JP) ............................ 2002-304025

(51) Int. Cl.
*G06F 12/00* (2006.01)
(52) U.S. Cl. ..................... 358/1.16; 358/1.17; 358/404; 382/305
(58) Field of Classification Search ................ 358/1.16, 358/402, 1.13, 1.17, 1.15, 404, 444, 450, 358/296, 401, 474; 399/1, 367, 363, 85; 395/115, 116; 355/40; 382/312, 305
See application file for complete search history.

(56) References Cited

U.S. PATENT DOCUMENTS

| | | | | |
|---|---|---|---|---|
| 5,315,397 A | * | 5/1994 | Inoue et al. ................. | 358/296 |
| 5,867,278 A | * | 2/1999 | Takahashi et al. ........... | 358/296 |
| 5,930,003 A | * | 7/1999 | Kondo ........................ | 358/404 |
| 6,052,201 A | * | 4/2000 | Shibaki et al. ............. | 358/1.16 |
| 6,317,193 B2 | * | 11/2001 | Funahashi .................... | 355/40 |
| 6,480,295 B1 | * | 11/2002 | Taoda ........................ | 358/1.16 |

(Continued)

FOREIGN PATENT DOCUMENTS

JP    04-373252    12/1992

(Continued)

OTHER PUBLICATIONS

Notification of Reason for Refusal issued in a corresponding Japanese application; and translation thereof.

(Continued)

*Primary Examiner*—Edward L Coles
*Assistant Examiner*—Ashish K Thomas
(74) *Attorney, Agent, or Firm*—Buchanan Ingersoll & Rooney PC

(57) ABSTRACT

A server, which functions as an image data control device, stores image data based on input information into a hard disk of a storage unit, reads sequentially the image data stored in the hard disk sequentially, and detects the usage status of the hard disk in the course of reading the image data. Further, based on the detection result of the usage status of the hard disk, the server provides control for deleting from the hard disk at least a portion of the image data, which has already been read, among image data being read.

17 Claims, 19 Drawing Sheets

U.S. PATENT DOCUMENTS

| | | | |
|---|---|---|---|
| 6,795,210 B1 * | 9/2004 | Fujiwara | 358/1.18 |
| 6,850,653 B2 * | 2/2005 | Abe | 382/312 |
| 6,870,634 B1 * | 3/2005 | Morikawa | 358/1.16 |
| 6,876,466 B1 * | 4/2005 | Morikawa et al. | 358/1.17 |
| 6,947,182 B1 * | 9/2005 | Kumagai | 358/402 |
| 6,975,423 B2 * | 12/2005 | Koakutsu et al. | 358/1.16 |
| 2002/0015171 A1 * | 2/2002 | Tsunekawa | 358/1.13 |
| 2002/0044303 A1 * | 4/2002 | Saito et al. | 358/450 |
| 2003/0202209 A1 * | 10/2003 | Mellor et al. | 358/1.16 |

FOREIGN PATENT DOCUMENTS

| | | |
|---|---|---|
| JP | 08-238811 | 9/1996 |
| JP | 10-171617 | 6/1998 |
| JP | 10-336375 A | 12/1998 |
| JP | 11-289436 | 10/1999 |
| JP | 2000-069257 | 3/2000 |
| JP | 2000-198257 A | 7/2000 |

OTHER PUBLICATIONS

Decision of Refusal issued by the JP Patent Office on Jul. 11, 2006 in Priority Appln. No. 2002-304025 and English translation thereof.

* cited by examiner

FIG. 9

| STORED DATA NAME | CONTENTS |
|---|---|
| REFERENCE FLAG | WHEN OWN JOB IS REFERENCING ANOTHER JOB, OR ANOTHER JOB IS REFERENCING OWN JOB, IT IS SET TO OFF. |
| TIME LIMIT FLAG | IN CASE OF A JOB TO BE STORED WITH TIME LIMIT, IT IS SET TO OFF. WHEN IT BECOMES UNNECESSARY TO STORE, IT IS SET TO ON. |
| DELETION FLAG | IT IS SET TO ON IN CASE OF A JOB TO BE ULTIMATELY DELETED. |
| JOB NUMBER | JOB ID NUMBER IS STORED. |
| JOB STORAGE LOCATION INFORMATION | JOB STORAGE LOCATION (ADDRESS) IS STORED. |
| JOB COMPLETION DATE/TIME INFORMATION | JOB COMPLETION DATE/TIME IS STORED. |
| SIZE INFORMATION | JOB'S TOTAL DATA SIZE IS STORED. |
| STORAGE LIMIT INFORMATION | INFORMATION FOR INDICATING TIME LIMIT FOR STORING JOB IS STORED. |
| UPDATE DATE/TIME INFORMATION FOR JOB-COMMON HEADER | INFORMATION FOR INDICATING FINAL UPDATE DATE/TIME FOR JOB-COMMON HEADER IS STORED. |
| REFERENCE INFORMATION | INFORMATION CONCERNING OTHER JOBS THAT OWN JOB IS REFERENCING IS STORED. |

FIG. 21

| NO. | REFERENCE FLAG | TIME LIMIT FLAG | JOB-COMMON HEADER'S EXISTENCE | LATEST JOB ? | RESULT OF DELETION FLAG |
|---|---|---|---|---|---|
| 1 | ON | ON | YES | NOT LATEST | ON |
| 2 | ON | — | CHANGED TO DELETION SCHEDULED JOB-COMMON HEADER | NOT LATEST | ON |

IMAGE DATA CONTROL DEVICE, IMAGE DATA CONTROL PROGRAM, COMPUTER READABLE RECORDING MEDIUM ON WHICH THE PROGRAM IS STORED, IMAGE FORMING DEVICE, AND IMAGE READING DEVICE

This application is based on Japanese Patent Application No. 2002-304025, filed on Oct. 18, 2002, the contents of which are hereby incorporated by reference.

BACKGROUND OF THE INVENTION

1. Field of the Invention

The present invention relates to an image data control device, an image data control program, a computer readable recording medium on which the program is stored, an image forming device, and an image reading device. In particular, the invention relates to an image data control device having a storage device for accumulating jobs containing image data.

2. Description of the Related Art

An image forming device such as a digital copying machine incorporates, in addition to a memory for storing image data by page during printing, a high capacity hard disk capable of storing jobs containing image data.

In this kind of image forming device, since it is possible to accumulate jobs already processed, for example, with printing, in a storage device such as a hard disk, it is also possible to reuse the accumulated processed jobs, for example, by reprinting them.

However, when the hard disk capacity is reached, it is sometimes necessary for a user to remove some of the accumulated jobs manually in order to execute a new job. In order to solve this problem, equipment has been known, for example, a device disclosed by Unexamined Publication No. JP-A-10-171617 that monitors the space available in the hard disk when a job is to be stored in the hard disk and automatically removes old jobs on the first come first out basis.

However, in case of the device disclosed by the publication, it may not be possible to store a new job due to capacity limitation, if the job is as large as over 10,000 pages of image data, even if old jobs are removed. In this case, not only the old stored jobs are automatically removed and destroyed, but also the new job with a large data size is still not executable, thus creating a problem of being unable to achieve an efficient and appropriate use of the hard disk.

SUMMARY OF THE INVENTION

It is an object of the present invention to provide an image data control device, an image data control program, a computer readable recording medium on which the program is stored, an image forming device, and an image reading device that are capable of achieving an efficient and appropriate use of a storage device that accumulates jobs including image data.

It is also a more specific object of the invention to provide an image data control device, an image data control program, a computer readable recording medium on which the program is stored, an image forming device, and an image reading device that are capable of executing a new job regardless of the data size of the job, while maintaining the storage conditions of jobs containing image data already accumulated in the storage device.

According to an aspect of the invention, there is provided an image data control device comprising: a storage device for sequentially storing image data based on input information; a reader for sequentially reading the image data stored in the storage device; a detector for detecting the storage device's usage status in the course of reading the image data; and a controller for providing control for deleting from the storage device at least a portion of the image data, which has already been read, among the image data being read, when it is judged that the storage device's usage amount has exceeded a specified ratio of the storage device's entire capacity based on the detector's detection result.

According to this invention, it is possible to achieve an efficient and appropriate use of a storage device for accumulating jobs containing image data. More specifically, it is possible to execute a job being entered with a large data size without losing jobs containing image data already stored in storage device.

According to another aspect of the invention, there is provided an image data control program that causes a computer to execute a process comprising the steps of: 1) sequentially reading the image data sequentially stored into a storage device based on input information; 2) detecting the storage device's usage status in the course of reading the image data; and 3) providing control for deleting from the storage device at least a portion of the image data, which has already been read, among the image data being read, when it is judged that the storage device's usage amount has exceeded a specified ratio of the storage device's entire capacity based on detection result in step 2).

According to still another aspect of the invention, there is provided an image forming device comprising: a storage device for sequentially storing image data based on input information; a reader for sequentially reading the image data stored in the storage device; a printing unit for printing the image data read by the reader; a detector for detecting the storage device's usage status in the course of reading the image data; and a controller for providing control for deleting from the storage device at least a portion of the image data, which has already been read, among the image data being read, when it is judged that the storage device's usage amount has exceeded a specified ratio of the storage device's entire capacity based on the detector's detection result.

According to a further aspect of the invention, there is provided an image reading device comprising: a scanner for scanning a document; a storage device for sequentially storing image data based on input information acquired by the scanner; a reader for sequentially reading the image data stored in the storage device; a transmitter for transmitting the image data read by the reader; a detector for detecting the storage device's usage status in the course of reading the image data; and a controller for providing control for deleting from the storage device at least a portion of the image data, which has already been read, among the image data being read, when it is judged that the storage device's usage amount has exceeded a specified ratio of the storage device's entire capacity based on the detector's detection result.

The objects, characteristics and properties of this invention other than those set forth above will become appartent from the description given herein below with reference to preferred embodiments illustrated in the accompanying drawings.

BRIEF DESCRIPTION OF THE DRAWINGS

FIG. 9 is a diagram showing the contents of a job control block;

FIG. 21 is a diagram showing a deletion condition.

DETAILED DESCRIPTION OF THE PREFERRED EMBODIMENTS

The embodiments of this invention will be described below with reference to the accompanying drawings.

Figure 1:
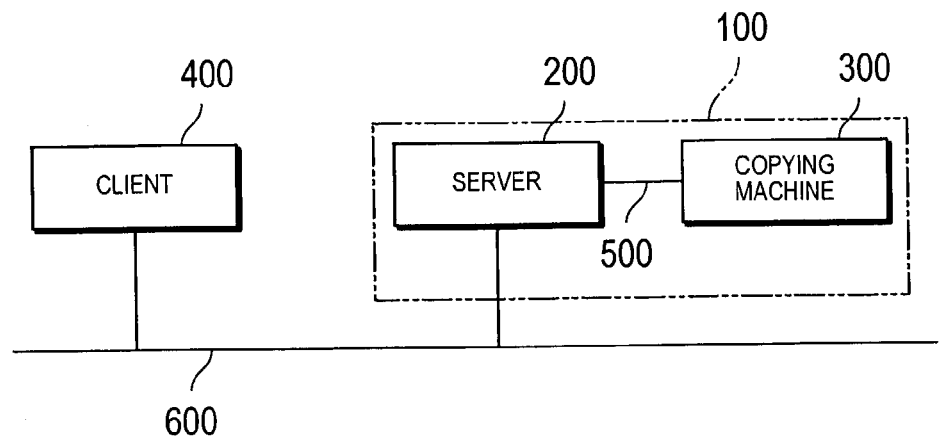
FIG. 1 is a block diagram showing the constitution of a network system where a server is used as an image data control device according to an embodiment of the present invention.

FIG. 1 is a block diagram showing the constitution of a network system where a server is used as an image data control device according to an embodiment of the present invention.

The network system shown in FIG. 1 has a multi-function peripheral (MFP) 100. The MFP 100 consists of a server 200 and a copying machine 300 that functions as an image forming device connected to the server 200 via a cable 500.

The server 200 of the MFP 100 is connected with a client 400 via a network 600 to be communicable with each other. The network 600 can be a LAN based on standards such as Ethernet®, Token Ring, FDDI, etc., or a WAN consisting of LANs connected by a dedicated line. The types and the number of equipment to be connected to the network are not limited to those shown in FIG. 1.

The MFP 100 has, in addition to the copying function, a function as a network printer for printing with the copying machine 300 the data received via the network 600 from other equipment, for example, the client 400, and a function as a network scanner for transmitting image data obtained by reading a document with the copying machine 300 to other equipment such as the client 400 via network 600. In transmitting image data obtained by reading a document in this embodiment, it is possible for a user to select of the user's preference from a transmission method using e-mail, a transmission method according to FTP, and a transmission method according to HTTP.

Figure 2:
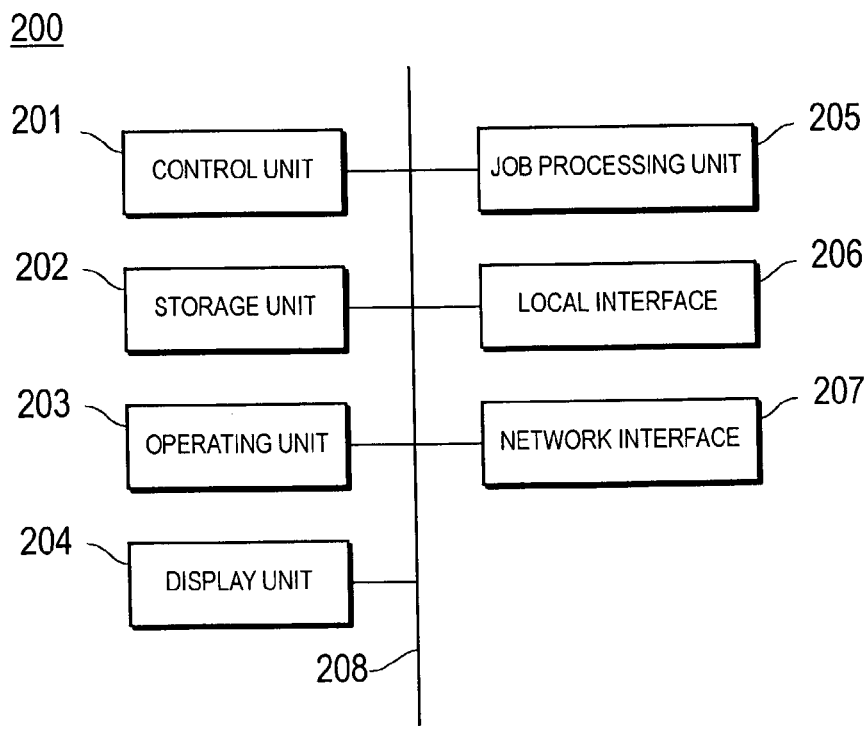
FIG. 2 is a block diagram showing the constitution of the server shown in FIG. 1.
Figure 3:
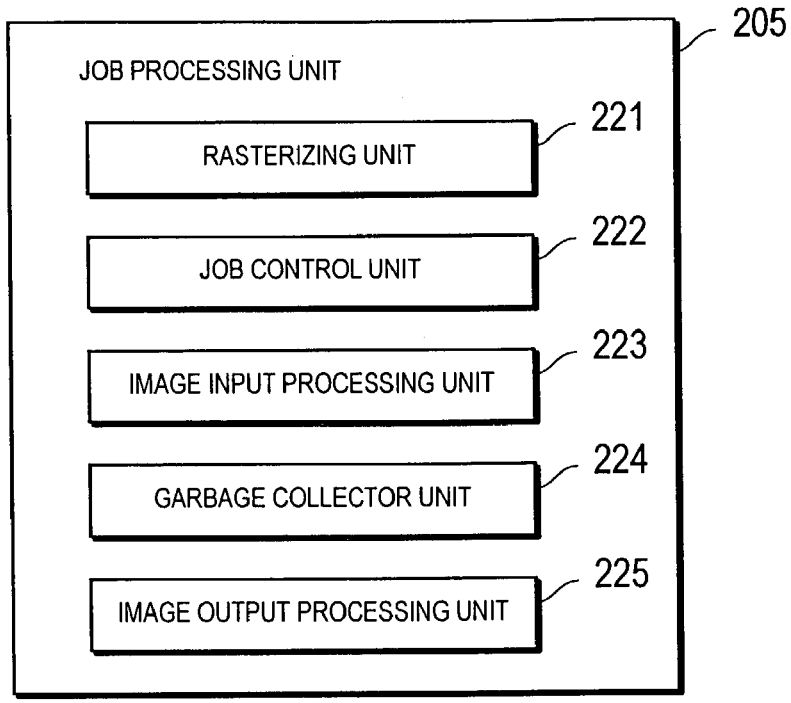
FIG. 3 is a diagram showing the constitution of the job processing unit shown in FIG. 2.

FIG. 2 is a block diagram showing the constitution of the server shown in FIG. 1, and FIG. 3 is a diagram showing the constitution of the job processing unit shown in FIG. 2.

As shown in FIG. 2, the server 200 includes a control unit 201, a storage unit 202, an operating unit 203, a display unit 204, a job processing unit 205, a local interface 206, and a network interface 207, all of which are interconnected by a bus 208 for exchanging signals.

The control unit 201 contains a CPU that is in charge of the control of the entire device and performs various arithmetic processes. The storage unit 202 consists of a ROM for storing various programs and data, a RAM for storing temporarily programs and data as a working area, a hard disk for storing various programs and various data read into RAM during the execution of programs by the control unit, and others.

The server 200 is capable of accumulating printing jobs containing image data to be printed by the MFP 100 based on its function as the network printer, and accumulating scanned jobs containing image data to be transmitted by the MFP 100 as the network scanner on the hard disk of the storage unit 202. Therefore, it is possible to reuse the accumulated processed job for reprinting and transmission. Although jobs to which this invention include both printing jobs and scan jobs, the description in the following will primarily deal with a printing job.

Figure 5:
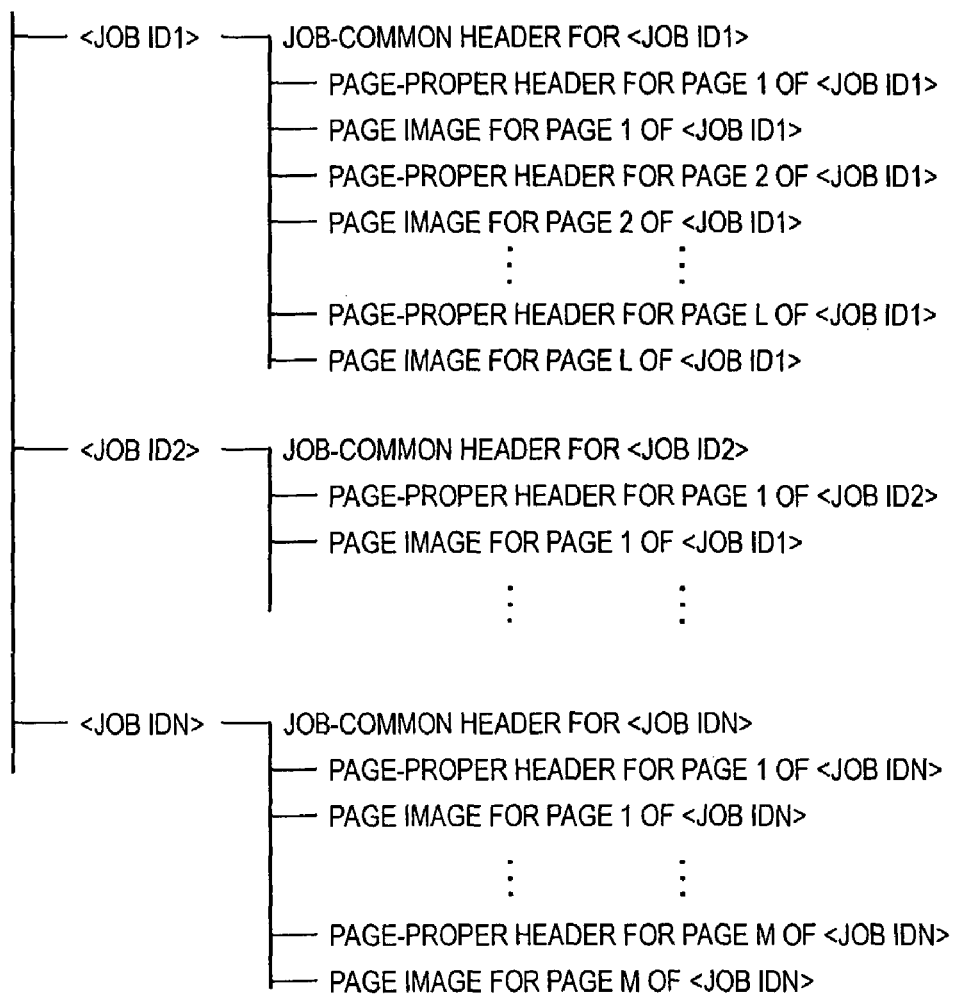
FIG. 5 is a diagram showing the data constitution of a job.

FIG. 5 is a diagram showing the data constitution of a job. As shown in FIG. 5, a directory is made for each job. A job formed as a directory consists of three files; i.e., a header common to the job (hereinafter called "job-common header"), a header dedicated to the page (hereinafter called "page-proper header"), and a page image. The information concerning the entire job is described in the job-common header. Various printing conditions such as the number of copies to be made, presence or lack of staples and their locations, as well as other information such as a job number and a storage limit information described later, etc., will be described in the job-common header. Moreover, the image data is included in the job as multiple page images that are filed by each page. The information concerning the corresponding page image is described in the page-proper header.

The operating unit 203 is used for entering characters and numerical values, or various instructions. The display unit 204 is used for various displays and consists of, for example, a liquid crystal display.

As shown in FIG. 3, the job processing unit 205 is equipped with a rasterizing unit 221, a job control unit 222, an image input processing unit 223, a garbage collector unit 224, and an image output processing unit 225.

The rasterizing unit 221 develops the data written in a printing control language into bitmap data. The job control unit 222 controls such processes as entering, accumulation, and execution of a job. The image input processing unit 223 receives jobs containing image data and stores the received jobs into the hard disk temporarily. The garbage collector unit 224 controls the storage of the jobs stored in the hard disk of the storage unit 202. This garbage collector unit 224 performs the job deletion according to a specified condition. The image output processing unit 225 reads a job containing image data from the hard disk of the storage unit 202 and issues the read image data. In this embodiment, each function of the job processing unit 205 is realized as the control unit 201 executes a specified program stored in the storage unit 202.

The local interface 206 is an interface for direct communications between the devices, and corresponds to, for example, the USB standard. However, the local interface 206 can be such that corresponds to various wired communication standards such as SCSI, RS-232C, IEEE 1394, and IEEE 1284, or wireless communication standards such as Bluetooth®, IEEE 802.11, and IrDA®.

The network interface 207 is an interface to be connected to the network 600, and consists of a LAN card.

The server 200 can contain constitutional elements other than those described above, or may not include a portion of the abovementioned elements. For example, the control unit 203 and the display unit 204 may be omitted. In this case, it is possible to control the server 200 remotely from the client 400.

Figure 4:
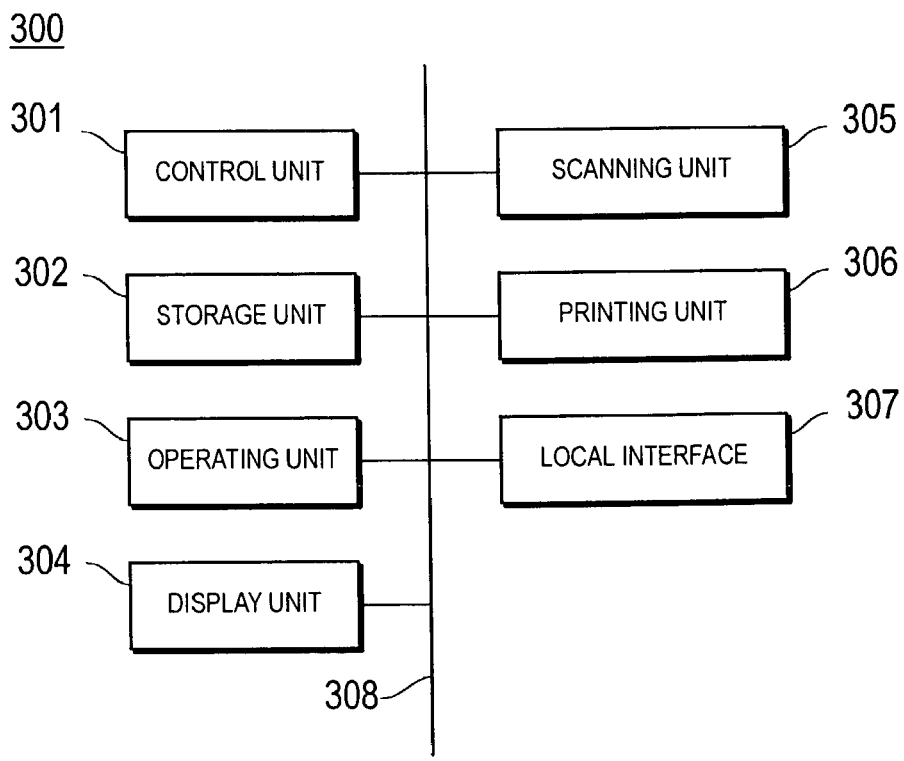
FIG. 4 is a block diagram showing the constitution of the copying machine shown in FIG. 1.

FIG. 4 is a block diagram showing the constitution of the copying machine shown in FIG. 1. As shown in FIG. 4, the copying machine 300 includes a control unit 301, a storage unit 302, an operating unit 303, a display unit 304, a scanning unit 305, a printing unit 306, and a local interface 307, all of which are interconnected by a bus 308 for exchanging signals. Of the constitutional elements of the copying machine 300, the descriptions of those portions that have similar functions as the corresponding constitutional elements of the server 200 will not be repeated here.

The scanning unit 305 is for scanning a document. The scanning unit 305 has light detecting elements such as CCD for converting reflecting lights from a document, which is lighted by a light source, into electrical signals. The scanning unit 305 is equipped with an automatic document feeder (ADF) for transporting a document one sheet at a time to the specified scanning position.

The printing unit 306 prints various data on a recording medium such as paper using a known image forming process such as an electronic photography type process.

The copying machine 300 may contain constitutional elements other than those described above, or may not include a portion of the abovementioned elements. Moreover, the image forming device connected to the server 200 is not limited to a copying machine and can be a printer, a scanner, etc.

The client 400 is, for example, a common personal computer (PC). A job control application is installed on the client 400. When the job control application is activated by the client 400, the client 400 communicates with the job control unit 222 of the server 200. Thus, the user can perform various operations related to a job via the client 400 such as a transmission request for a list of jobs that are stored in the server 200, a job deletion instruction for deleting specified jobs from the job list, an execution request of executing specified jobs again in the job list, and a request for preparing and executing reproduced jobs and combined jobs using specified jobs of the job list.

Here, the reproduced job is a separate job reproduced from another stored job. The image data accompanying the reproduced job can be obtained by referring to the other job, and the header's information can be rewritten. A reproduced job can be prepared as a backup. The combined job is a separate job formed by connecting two or more other jobs. The image data accompanying the combined job can be obtained by referring to the other multiple jobs, and the header's information can be rewritten. The combined job can include a job formed by connecting two or more other jobs that are stored in the storage unit, or a job formed by connecting one other stored job and a newly scanned job.

The reproduced or combined job can exist as a job including image data obtained by referring to at least one other job. In this case, although the reproduced or combined job owns only a job-common header, practically speaking, such a reproduced or combined job ("referencing job") is described in this specification as a job containing an image data obtained by referring to another job ("referenced job").

Next, the job process in the server 200 will be described below referring to FIG. 6 through FIG. 21. The algorithm shown in the flow chart of FIG. 6 through FIG. 8 and FIG. 10 through FIG. 20 is stored as a program in the storage unit 202 of the server 200 and executed by the control unit 201.

Figure 6:
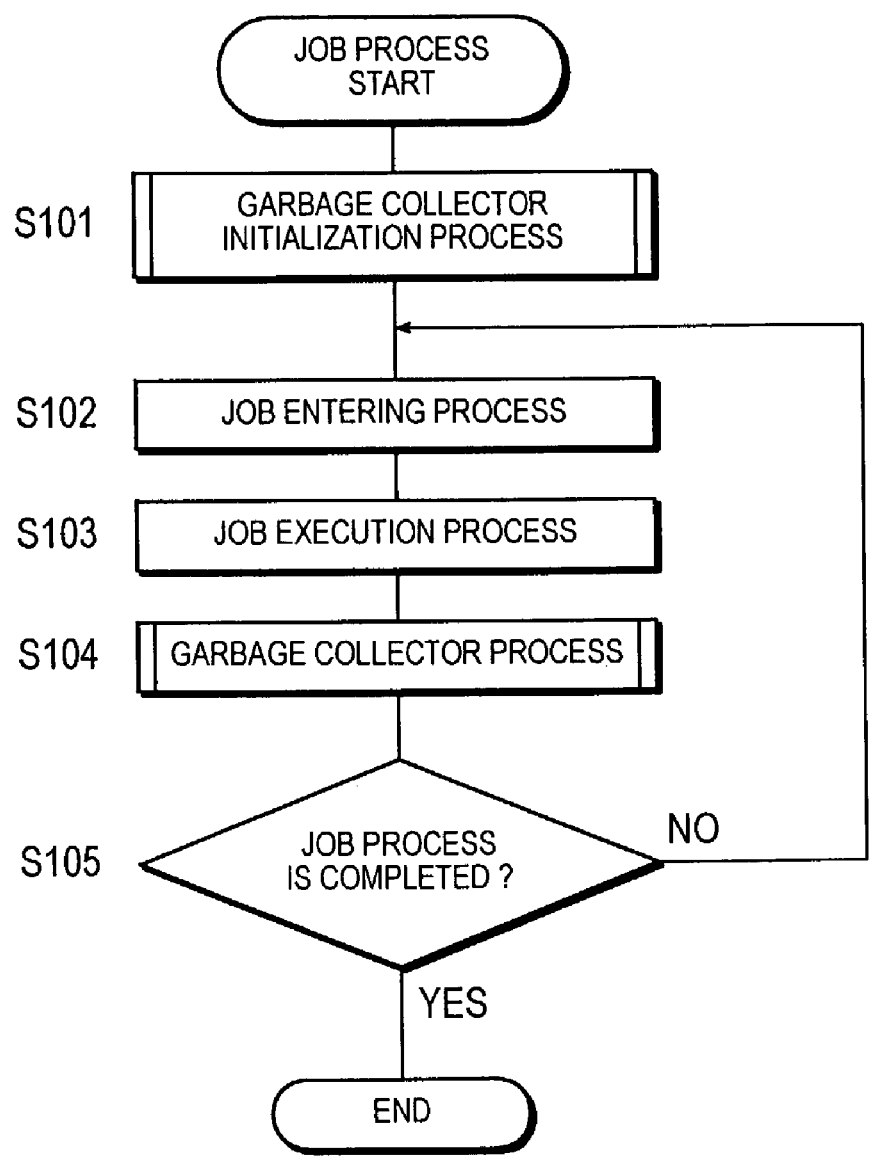
FIG. 6 is a main flowchart for generally describing a job processing in a server.

FIG. 6 is a main flowchart for generally describing a job processing in a server. When an application for the job processing is activated in the server 200, the garbage collector initialization process is executed (S101).

In the garbage collector initialization process, a job control block, which is the information for controlling the storage conditions of the processed jobs, is formed. The detail of the garbage collector's initialization process will be described later.

Then, the job entering process will be executed (S102). If the job is a printing job in a job entering process, the job may be received from the client 400, for example, and spooled. On the other hand, if the job is a scanning job, the server 200 monitors the status whether the image data to be transmitted has accumulated a specified amount in the storage unit 302 of the copying machine 300 by inquiring the copying machine 300. When the image data to be transmitted has accumulated a specified amount in the copying machine 300, a status report indicating the accumulation is received from the copying machine 300.

Then, the job execution process will be preformed (S103). In the job execution process, the job containing image data will be received in sequence by the RAM of the storage unit 202 and the received jobs will be stored in the hard disk of the storage unit 202 in sequence temporarily. Here, the job stored in the hard disk of the storage unit 202, is read sequentially from the hard disk to be stored in the RAM temporarily, and the read image data is issued as an output. If the job is a printing job, the image data is issued to the copying machine 300. On the other hand, if the job is a scan job, the image data is transmitted according to a specified protocol to a destination specified via the operating unit 303 of the copying machine 300, for example, the client 400.

During the execution of a job in this embodiment, more specifically, during the course of jobs, which contain image data stored in the hard disk of the storage unit 202, are being read sequentially, the usage status of the hard disk is detected. Further, when the usage of the hard disk has exceeded a specified ratio of the entire capacity, it is controlled to delete at least a portion of the page images, which has already been read among the image data being read. The detail of the control for deleting the page image from the hard disk during this job execution process will be described later.

When the job execution process is completed, the garbage collector process is performed (S104). In the garbage collector process, the job control block concerning the latest job that has been executed will be prepared and added to a job control list, and the job block that has been listed up will be updated. The contents of the job control list are referenced and a job will be deleted from the hard disk according to a specified condition.

In this embodiment, a judgment is made as to whether a particular job stored in the hard disk is assigned to be deleted from the hard disk. Then, among the jobs that are judged to have been designated to be deleted, the control prevents the "referenced job" containing image data that are referenced by the "referencing job" from being deleted from the hard disk. The detail of such garbage collector's process will be described later.

In the step S105, a judgment is made as to whether the application for the job process is completed. If the application of the job process has not been completed (S105: No), the system returns to the step S102.

Figure 7:
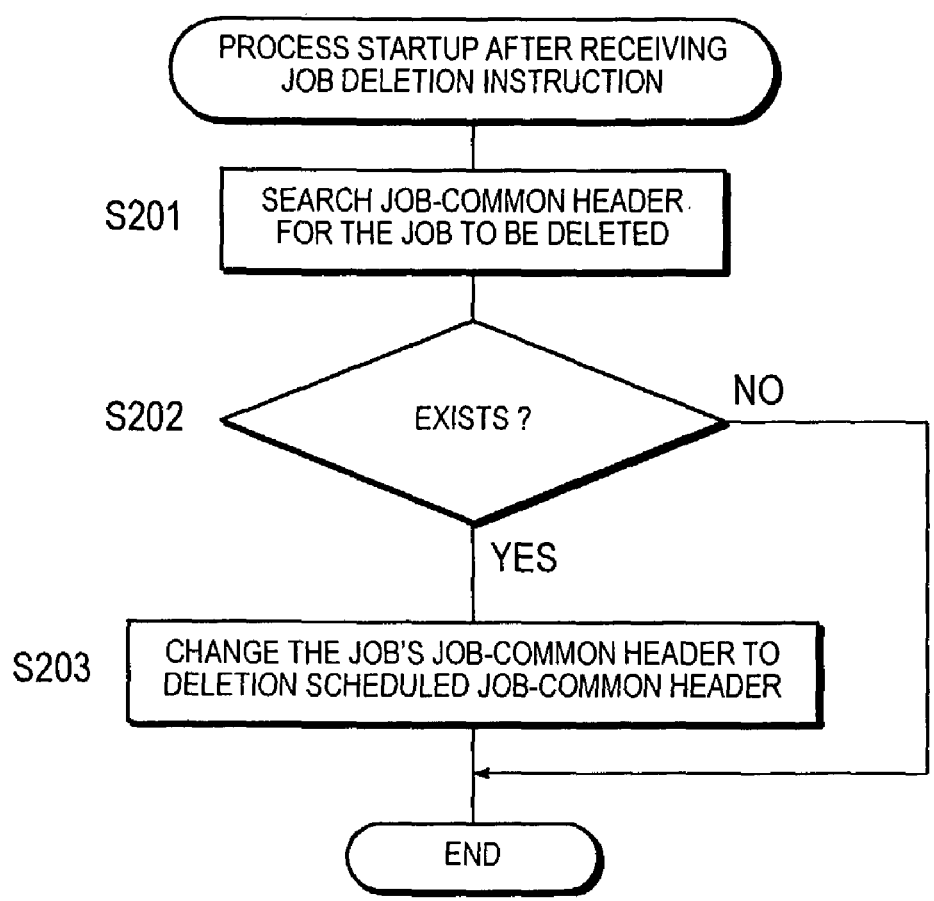
FIG. 7 is a flow chart for describing the process after the server's receipt of a job deletion instruction.

FIG. 7 is a flow chart for describing the process after the server's receipt of a job deletion instruction. When the server 200 received a job deletion instruction from the client 400, for example, by the user's operation, the server 200 first searches the job-common header of the job that is to be deleted (S201). At this point, a job list that shows all the jobs stored in the server 200 is transmitted to the client 400, and a job deletion instruction for deleting a certain job from the job list is transmitted from the client 400 to the server 200. The job deletion instruction can be entered through the operating unit 203 of the server 200.

Next, a judgment is made as to whether there is any job-common header of a job to be deleted as a result of the search (S202).

If there is no job-common header of a job to be deleted (S202: No), the process shown in FIG. 7 is terminated.

If there is a job-common header of a job to be deleted (S202: yes), the job-common header of a job to be deleted is changed to a header common to the deletion scheduled job (hereinafter called "deletion scheduled job-common header") (S203). The deletion scheduled job-common header is a header that contains information that shows receipt of a specific deletion instruction for deleting from the hard disk. For example, a method of changing the file extension of a header file, a method containing a specific flag, etc., can be used, but any other appropriate methods can be used for the purpose. A job having the deletion scheduled job-common header will be deleted from the hard disk in the garbage collector process of the step S104 after considering other conditions. This process of deleting a job having the deletion scheduled job-common header from the hard disk will be described later.

Figure 8:
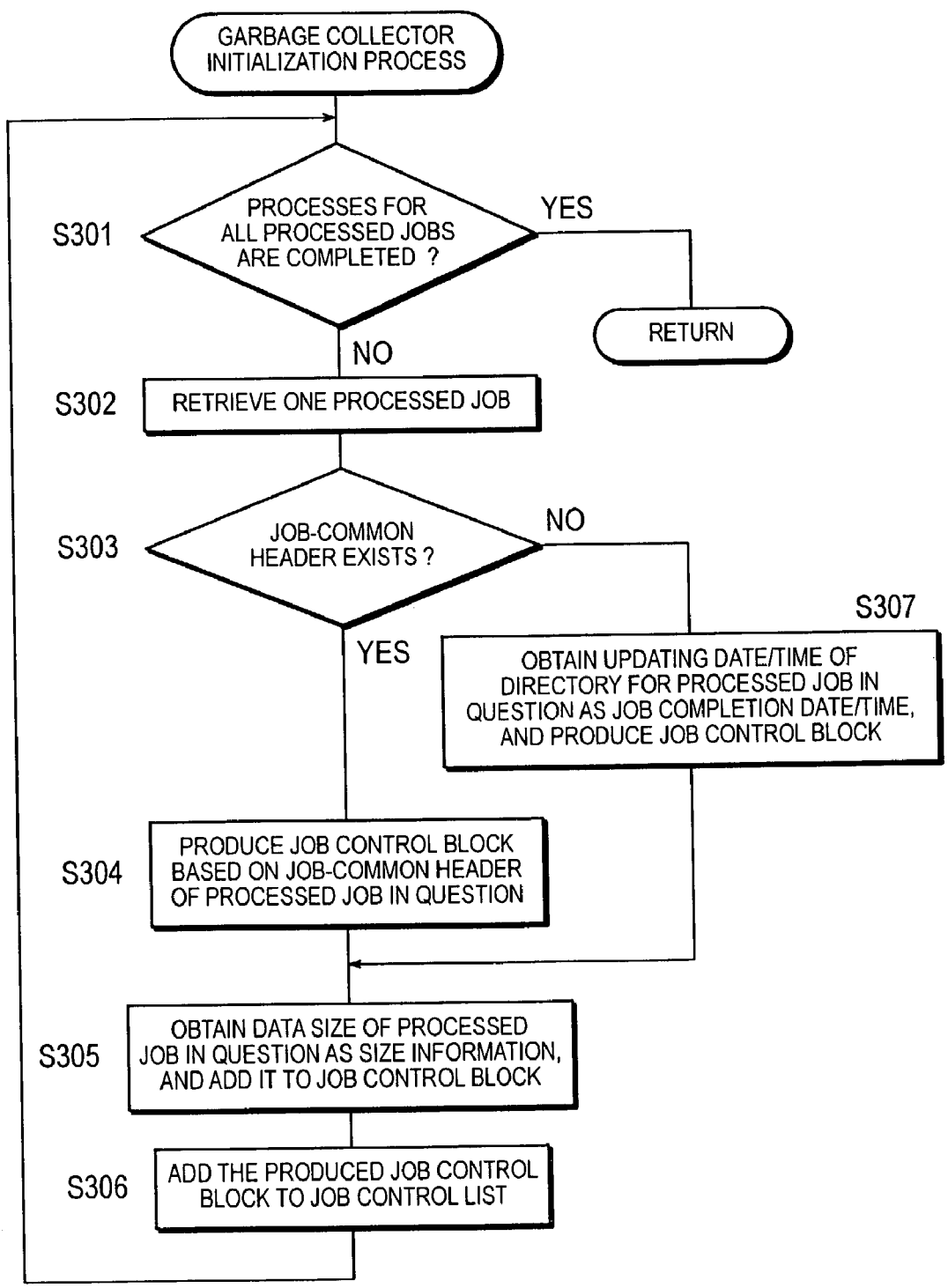
FIG. 8 is a flow chart for describing the garbage collector initialization process.

Next, the garbage collector initialization process of the step S101 shown in FIG. 6 will be described below with reference to FIG. 8.

First, a judgment is made as to whether the processes for all the processed jobs stored in the hard disk are completed (S301).

If the processes for all the processed jobs are not completed (S301: No), one processed job is retrieved (S302). At this point, the processed jobs are retrieved one by one, for example, in the order of the job numbers.

Next, a judgment is made as to whether any job-common header exists in the processed job in question, which is retrieved (S303).

If the processed job in question has the job-common header (S303: Yes), a job control block is produced for each job based on the job-common header of the processed job in question (S304).

FIG. 9 is a diagram showing the contents of a job control block. As shown in FIG. 9, the job control block contains a reference flag, a time limit flag, a deletion flag, a job number, job storage location information, job completion date/time information, size information, storage limit information, update date/time information for job-common header, and reference information.

The reference flag is a flag that will be set to OFF if the processed job in question is a reproduced job or a combined job, or if it is a job to be referenced by another job, which is a reproduced job or a combined job. This reference flag is used when a judgment is made as to whether the processed job in question becomes a target of deletion, i.e., if it satisfies the deletion condition (refer to S1303 of FIG. 20).

The time limit flag is a flag that will be set to ON when the job's storage time limit is over. The fact that the time limit flag is set to ON means that it is designated to be deleted from the hard disk. This time limit flag is also used when a judgment is made as to whether the processed job in question satisfies the deletion condition (refer to S1303 of FIG. 20).

The deletion flag is a flag that will be set to ON when the processed job in question is judged ultimately to be deleted. The deletion flag will be set to ON generally when the deletion condition is met (refer to S1304 of FIG. 20).

The job number is a number that uniquely identifies the own job from other jobs. This job number can be used as a reference target when the job is being referenced by other jobs.

The job storage location information is information that indicates the job's storage location (address) in the hard disk. The job's storage location information is used for deleting the processed job from the hard disk.

The job completion date/time information is information indicating the date/time when the job's execution is completed. The job completion date/time information is used together with the storage limit information for changing the time limit flag.

The size information is information for indicating the total data size of the job. The size information is obtained in the step S305 to be described later.

The storage limit information is information for indicating the time limit for storing the job. The storage limit information is specified by the user's operation. This specification includes an absolute date/time specification for specifying the date/time of the storage limit and a relative specification for specifying the storage period from the job completion date/time. If no specification is made by the user's operation, a storage period from the job completion date/time is set up as the default value as described later.

The update date/time information for the job-common header is information for indicating the final update date/time for the job-common header. This update date/time information for the job-common header is used for detecting a job-common header updated after the garbage collector initialization process was completed.

The reference information is information concerning other jobs that the own job is referencing when the processed job in question is a reproduced job or a combined job.

On the other hand, if there is no job-common header in the processed job in question (S303: No), for example, only the directory was produced as a power outage occurred during the job execution, the system advances to the step S307. In the step S307, the update date/time of the directory of the processed job in question are obtained as the job completion date/time, and the job control block is produced (S307).

In the step S305, the data size of the processed job in question is obtained as the size information, and added to the job control block produced in the step S304. This size information represents specifically a total data size of the file (job-common header, page-proper header, and page image) owned by the processed job in question.

The completed job control block is added to the job control list for storing the job control block (S306). The system then returns to the process of the step S301 to repeat the process of the steps S301 through S307 until the processes for all the processed jobs are completed (S301: Yes). Thus, the job control blocks are produced for all the processed jobs already stored. Multiple job control blocks thus produced are stored as a single job control list in the storage unit 202.

Next, the output process of the image data in the job execution process of the step S103 of FIG. 6 will be described below with reference to FIG. 10 and FIG. 11. Such a process, if the job is a printing job, is a process of sequentially reading and printing (outputting) the page image data entered sequentially in the job input process of the step S102.

First, the page index, which is a variable representing the page number of the page image in question, is set to "1" (S401).

Next, a job forced deletion instruction flag is set to OFF as the initial setting (S402). The job forced deletion instruction flag is a flag for indicating by setting it to ON the fact that the hard disk's usage amount has exceeded a certain set ratio of its entire capacity during a job execution process.

A judgment is made as to whether the current page index is larger than the page number of the last page image contained in the job being executed (S403). In other words, it is judged whether the output process of all the page images contained in the job being executed has been completed.

If the output process of all the page images has not been completed yet (S403: No), the page-proper header of the page number indicated by the current page index is read from the hard disk and taken into the RAM (S404). Next, the page image of the page number indicated by the current page index is read from the hard disk and taken into the RAM (S405). The order of execution of the steps S404 and S405 can be reversed.

When the usage status of the hard disk is detected and a judgment is made as to whether the hard disk's usage amount has exceeded a certain specified ratio (e.g., 90%) of its total capacity (S406).

If it is judged that the hard disk's usage amount has exceeded a certain specified ratio of its total capacity (S406: Yes), the page image of the page number indicated by the current page index will be deleted from the hard disk (S407) and the job forced deletion instruction flag will be set to ON (S408). On the other hand, if it is judged that the hard disk's usage amount has not exceeded a certain specified ratio of its entire capacity (S406: No), the system advances to the step S409.

In the step S409, the page image of the page number indicated by the current page index is issued. What is issued here is the page image taken into the RAM read from the hard disk. The step S409 can be executed immediately after the step S405.

The page index is added with "1" (S410), and the system returns to the process of the step S403 and the processes of the steps S403 through S410 are repeated until the output processes of all the page images contained in the job being executed are completed (S403: Yes).

Figure 12:
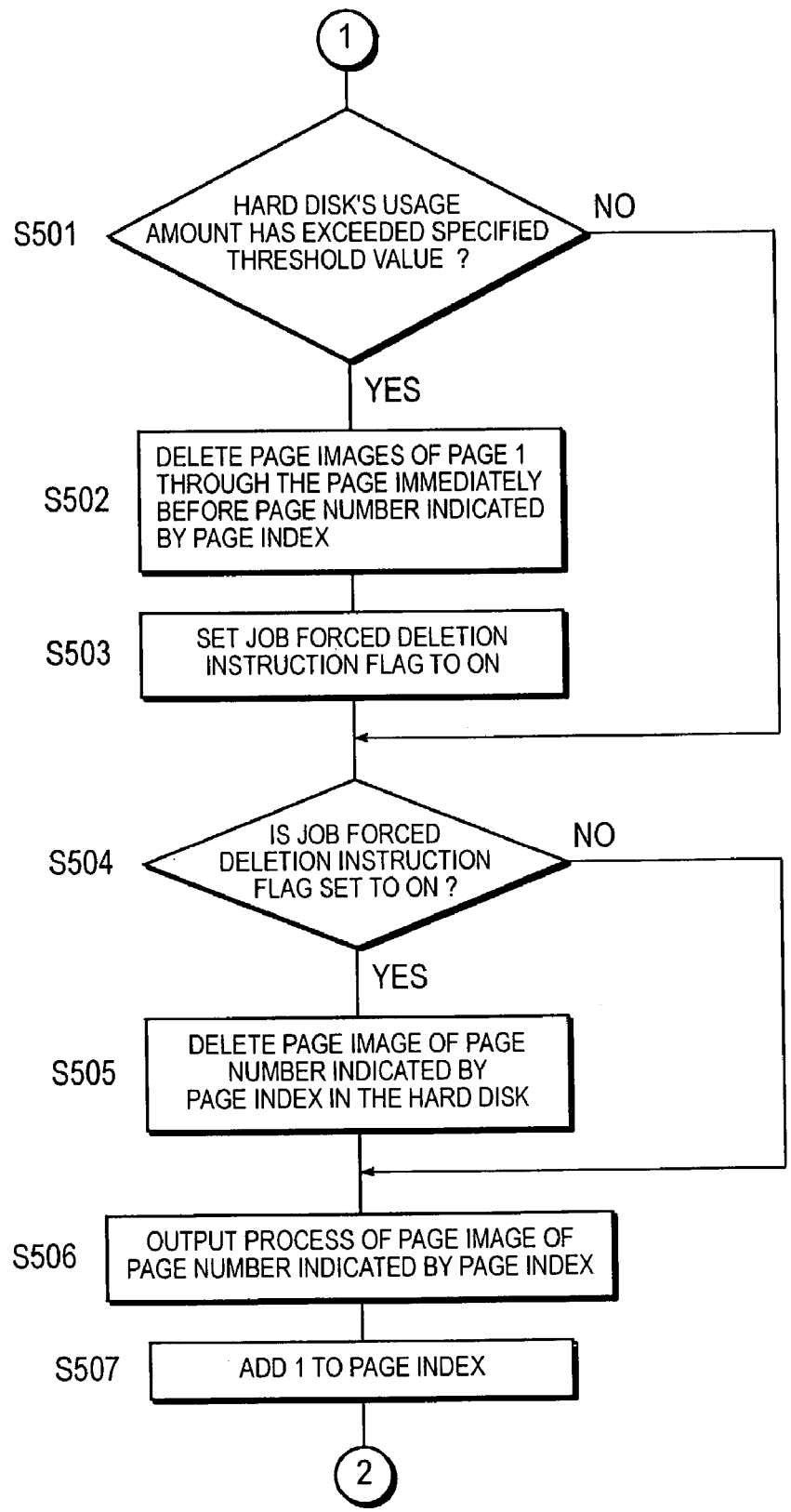
FIG. 12 is a flowchart for describing another version of an image data output process in a job execution process.

FIG. 12 is a flowchart for describing another version of an image data output process in a job execution process in the step S103 of FIG. 6. As the flow chart of FIG. 10 is also used in this version in a similar manner, its description is not repeated here. FIG. 12 is a flow chart continuing from FIG. 10.

In the step S501, the usage status of the hard disk is detected and a judgment is made as to whether the hard disk's usage amount has exceeded a certain specified ratio of its total capacity.

If it is judged that the hard disk's usage amount has exceeded a certain specified ratio of its total capacity (S501: Yes), the page images of page 1 through the page immediately before the page number indicated by the current page index will be deleted from the hard disk (S502) and the job forced deletion instruction flag will be set to ON (S503). On the other hand, if it is judged that the hard disk's usage amount has not exceeded a certain specified ratio of its entire capacity (S501: No), the system advances to the step S504.

In the step S504, a judgment is made as to whether the job forced deletion instruction flag is ON. If the job forced deletion instruction flag is ON (S504: Yes), the page image of the page number indicated by the current page index will be deleted from the hard disk (S505). On the other hand, the system advances to the step S506 if the job forced deletion instruction flag is not ON (S504: No).

In the step S506, the page image of the page number indicated by the current page index is issued.

The page index is added with "1" and the system returns to the process of the step S403 and the processes of the steps S403 through S405, and S501 through S507 are repeated until the output processes of all the page images contained in the job being executed are completed (S403: Yes).

Figure 10:
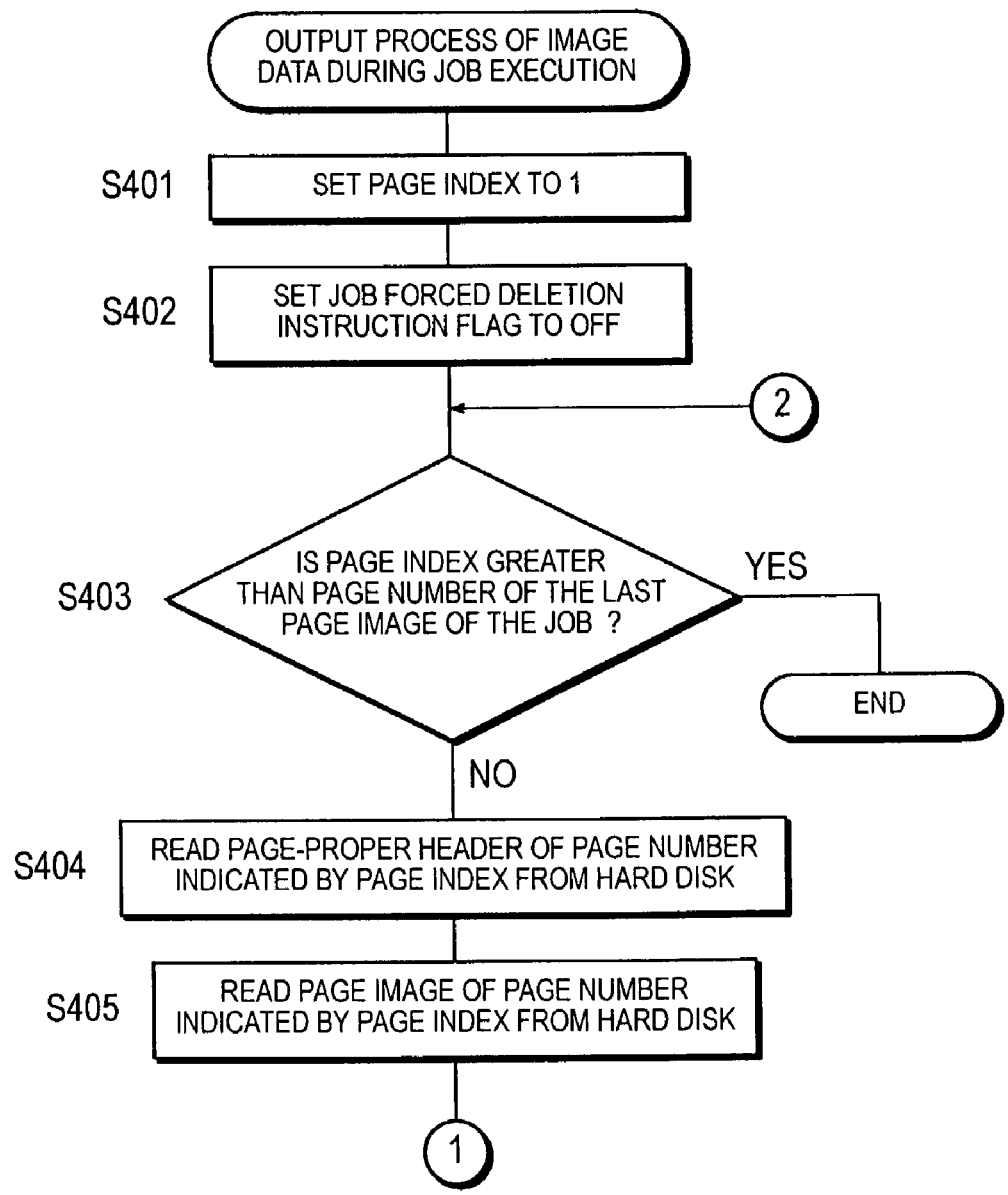
FIG. 10 is a flowchart for describing an image data output process in a job execution process.
Figure 11:
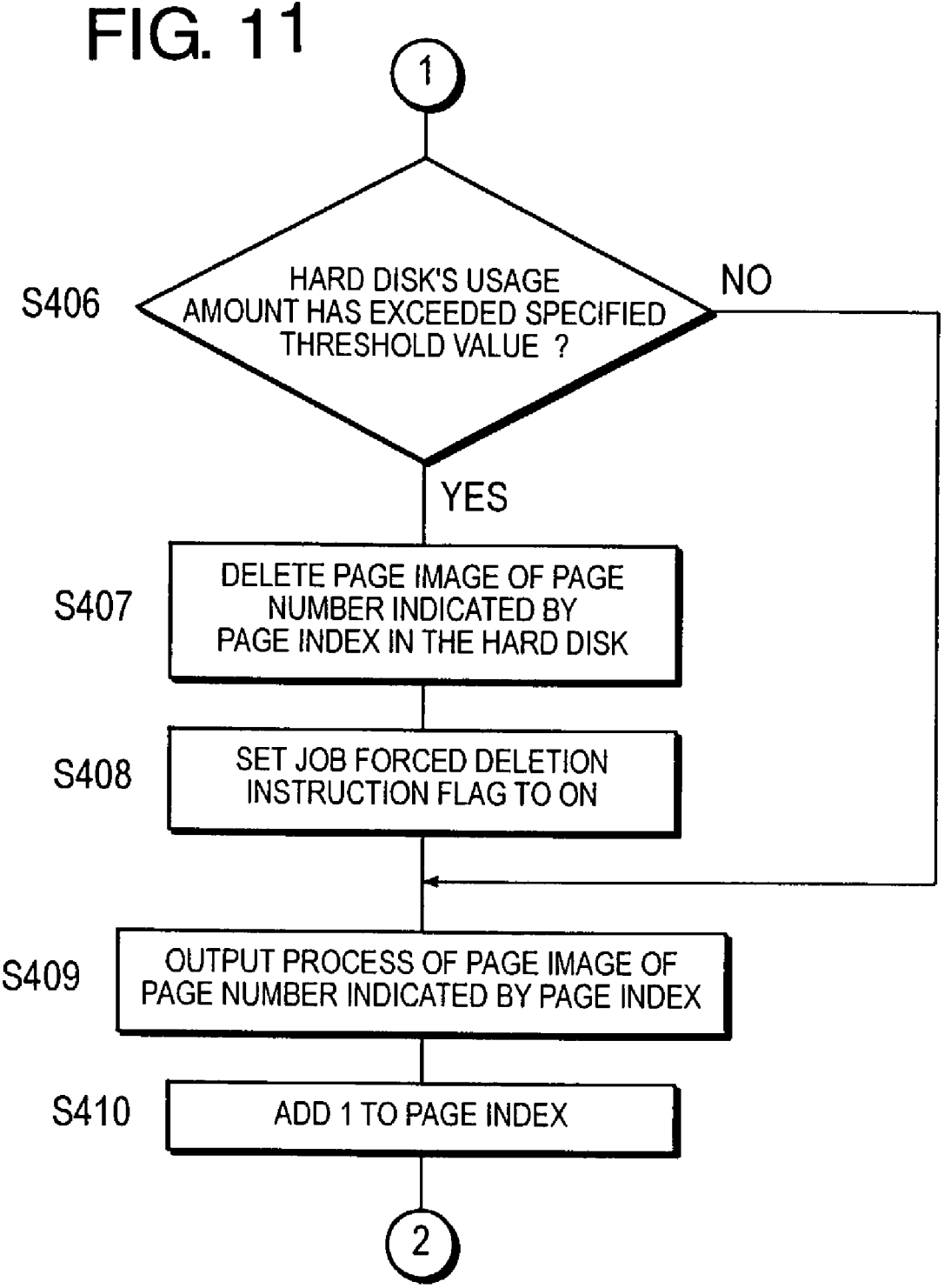
FIG. 11 is a flowchart for describing an image data output process in a job execution process continued from FIG. 10.

If it is judged that the hard disk's usage amount has exceeded a certain specified ratio of its total capacity during the job execution in the output process of the other version shown in FIG. 10 and FIG. 12, all of the page images contained in the job will be deleted from the hard disk. In other words, all the page images contained in the job will be deleted from the hard disk, including the page images read from the hard disk prior to the point when the hard disk's usage amount exceeded a certain specified ratio of its total capacity. Therefore, unnecessary use of the hard disk can be minimized. On the other hand, when it is judged that the hard disk's usage amount has exceeded the specified ratio of its total capacity during the execution of a job in the output process shown in FIG. 10 and FIG. 11, the page image that was read immediately before will be deleted from the hard disk. In other words, only the page images that are read from the hard disk after the point when the hard disk's usage amount has exceeded the specified ratio of its total capacity will be deleted sequentially. This minimizes the load on the job execution process and allows the process to be performed more smoothly, as it requires deleting only the necessary minimum amount of page images. However, in either case, the entire job including the header portion except the page image will eventually be deleted after the corresponding job's execution process is completed (refer to S803 and S804 of FIG. 15).

Figure 13:
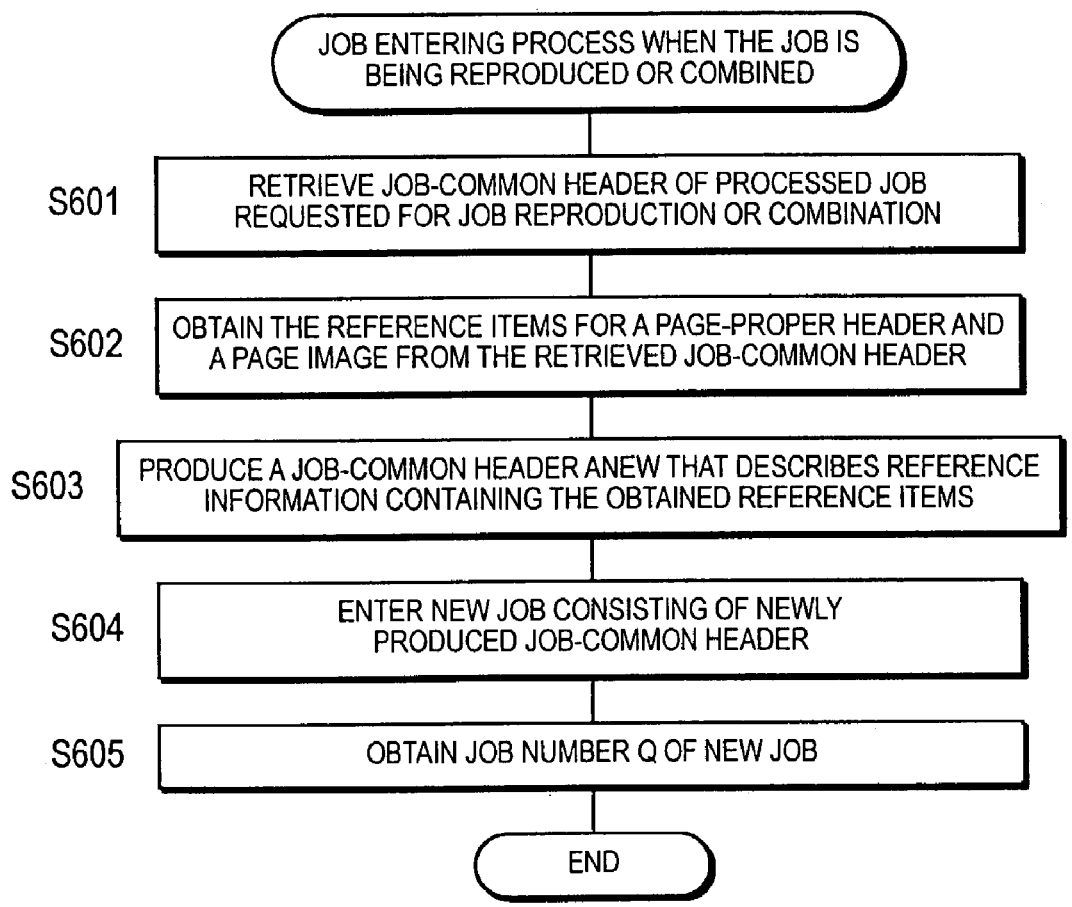
FIG. 13 is a flowchart for describing a job entering process when the job is being reproduced or combined.

Next, the job entering process when the job is being reproduced or combined will be described with reference to FIG. 13. FIG. 13 shows the case of reproducing or combining a job in the job entering process indicated as the step S102 in FIG. 6.

When a specified request concerning the reproduction or combination of a job is received from the client 400, the job-common header of the processed job, which is the target of the reproduction or combination, is retrieved (S601).

Next, the reference items for a page-proper header and a page image are obtained from the retrieved job-common header (S602). Next, the job-common header will be produced newly to include the description of the reference information containing the obtained reference items (S603). The reference information includes the job number of the referenced job, and the reference items for the page-proper header and the page image.

Then, a new job (a reproduced job or a combined job) that consists of a job-common header produced newly in the step S603 is entered (S604). In this case, the reproduced or combined job has only the job-common header, and the page-proper header and the page image are to be included in the reproduced or combined job by referencing the other job. Moreover, a job number Q is obtained for the new job entered in the step S604 (S605).

Figure 14:
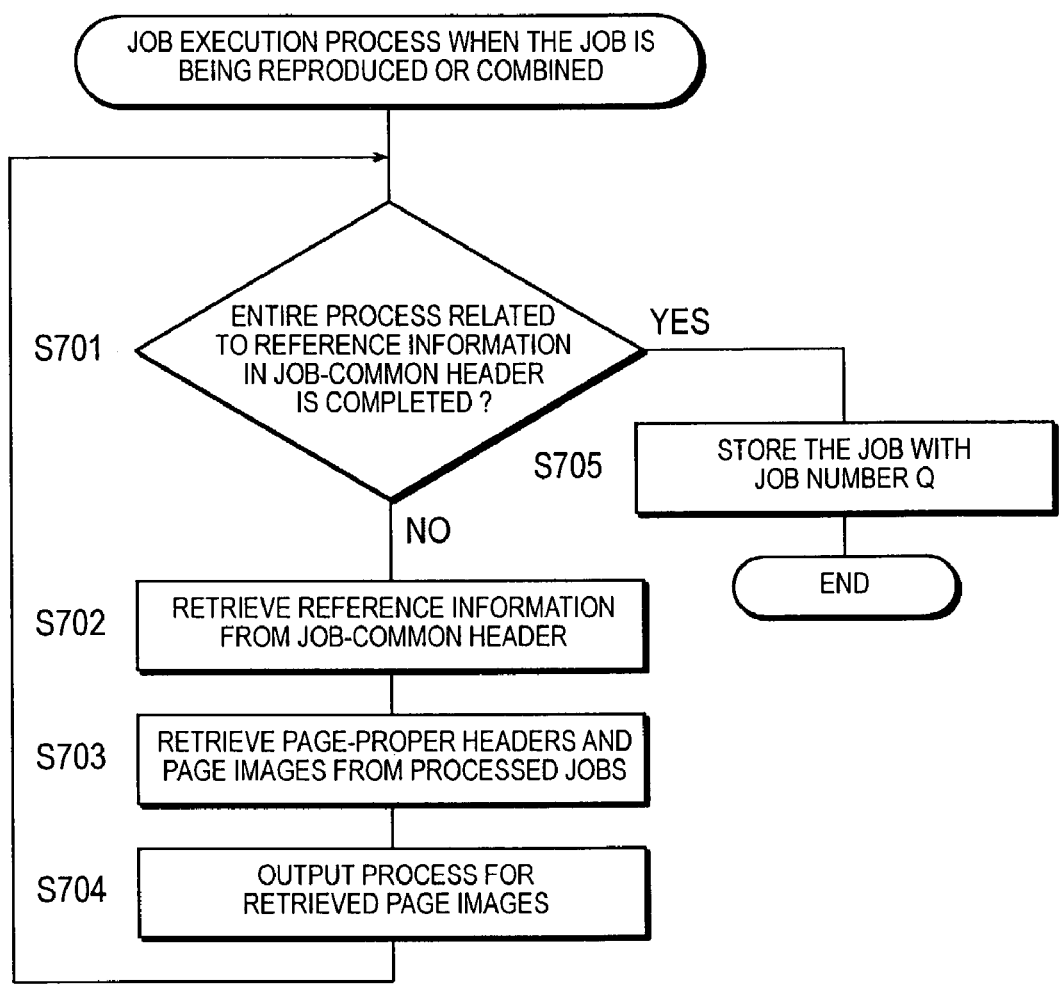
FIG. 14 is a flowchart for describing a job execution process when the job is being reproduced or combined.

Next, the job execution process when the job is being reproduced or combined will be described with reference to. FIG. 14. FIG. 14 shows the case of reproducing or combining a job in the job execution process indicated as the step S103 in FIG. 6, which will be executed following the process according to FIG. 13.

First, a judgment is made as to whether the entire process related to the reference information in the job-common header of the new job (reproduced or combined job) entered in the step S604 is completed (S701).

If the entire process related to the reference information has not been completed (S701: No), reference information that has not been processed is retrieved from the job-common header (S702).

Next, based on the reference information retrieved in the step S702, the page-proper header and the page image being referenced are retrieved from the processed jobs, which are stored in the hard disk of the storage unit 202, into the RAM (S703).

The page image retrieved into the RAM is now issued based on the information of the job-common header (S704).

If the entire process related to the reference information is completed (S701: Yes), the job with the job number Q (refer to S605) is stored in the hard disk (S705).

Figure 15:
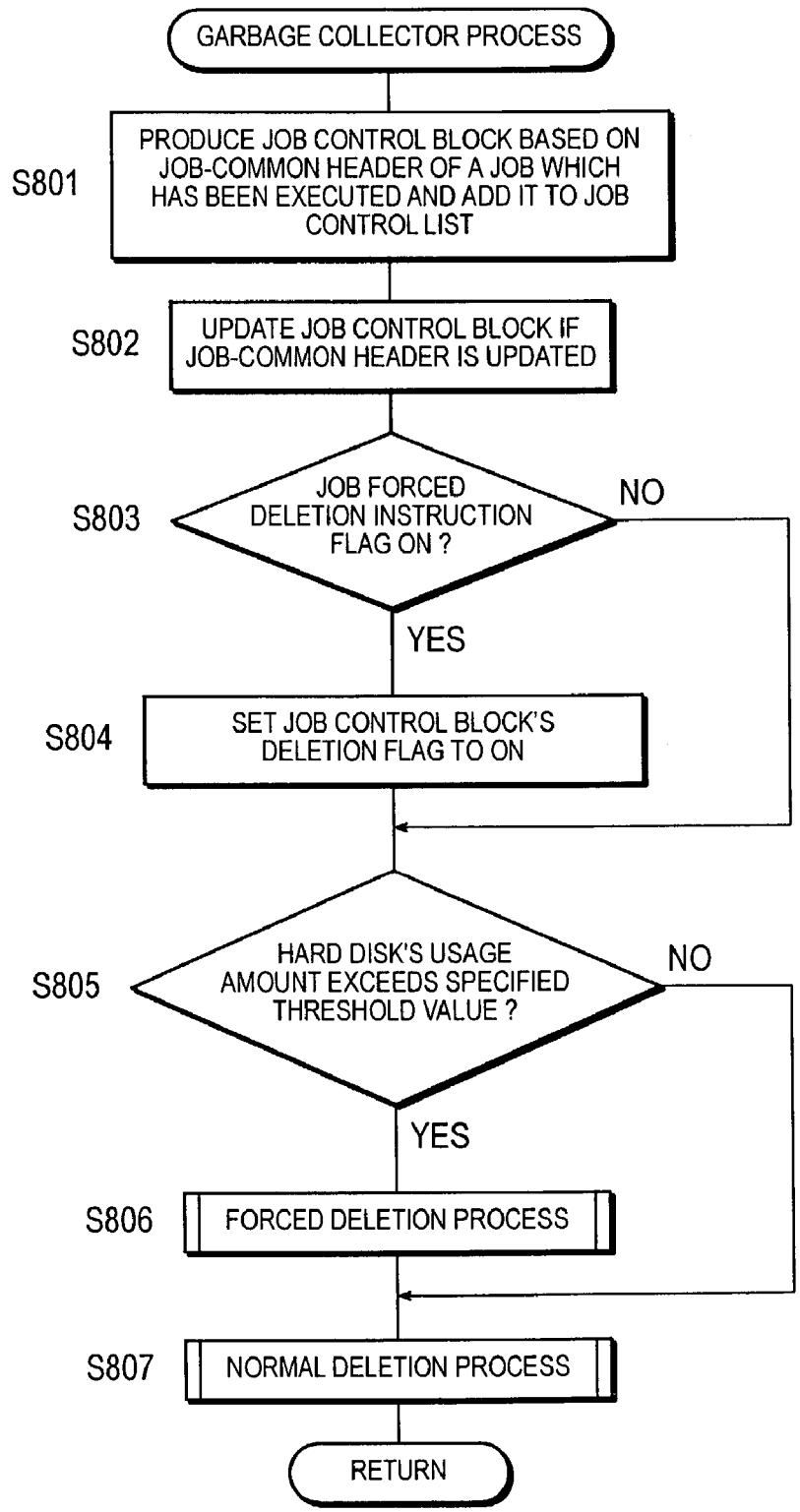
FIG. 15 is a flow chart for describing a garbage collector process.

Next, the garbage collector process of the step S104 shown in FIG. 6 will be described below with reference to FIG. 15.

First, a job control block is produced based on the job-common header of a job, whose job execution process indicated as the step S103 in FIG. 6 is completed. The job control block thus produced is added to the job control list (S801).

Next, if the job-common header of the job, which has been executed, is updated, the job control block will be updated as well (S802). Here, the update date/time information of the job-common header in the job control block is used. For example, when a processed job is reprinted, the job completion date/time information contained in the job-common header changes, which will then be reflected on the job control block.

In the step S803, a judgment is made as to whether the job forced deletion instruction flag (refer to the steps S402, S408 and S503) related to the job whose execution is completed is ON.

If the job forced deletion instruction flag is ON (S803: Yes), the deletion flag in the job control block related to the job is set to ON (S804). The default value of the deleted flag is OFF.

If the hard disk's usage amount has exceeded the specified ratio of its total capacity during a job execution, the page images already retrieved among the image data being retrieved will be deleted and the job forced deletion instruction flag will be set to ON (refer to the steps S407, S502 and S505), the process of this step S804 enables the entire job, whose page images are deleted, to be deleted later completely including the header portion.

On the other hand, the system advances to the step S805 if the job forced deletion instruction flag is not ON (S803: No).

In the step S805, the usage status of the hard disk is detected and a judgment is made as to whether the hard disk's usage amount exceeds a certain specified ratio (e.g., 90%) of its total capacity. Here a judgment is made as to whether the hard disk's usage amount ended up exceeding the specified ratio of its total capacity at the end of the job, although the hard disk's usage amount did not exceed the specified ratio of its total capacity while the job was being executed.

If it is judged that the hard disk's usage amount has exceeded the specified amount of its capacity (S805: Yes), the forced deletion process for deleting the processed jobs forcibly in order to secure a vacant space on the hard disk (S806). The detail of the forced deletion process will be described later.

On the other hand, if it is not judged that the hard disk's usage amount has exceeded a certain specified ratio of its entire capacity (S805: No), the system advances to the step S807.

In the step S807, a normal deletion process is performed for deleting the processed jobs for general reasons such as the expiration of the storage period (S807). The detail of the normal deletion process will be described later.

Figure 16:
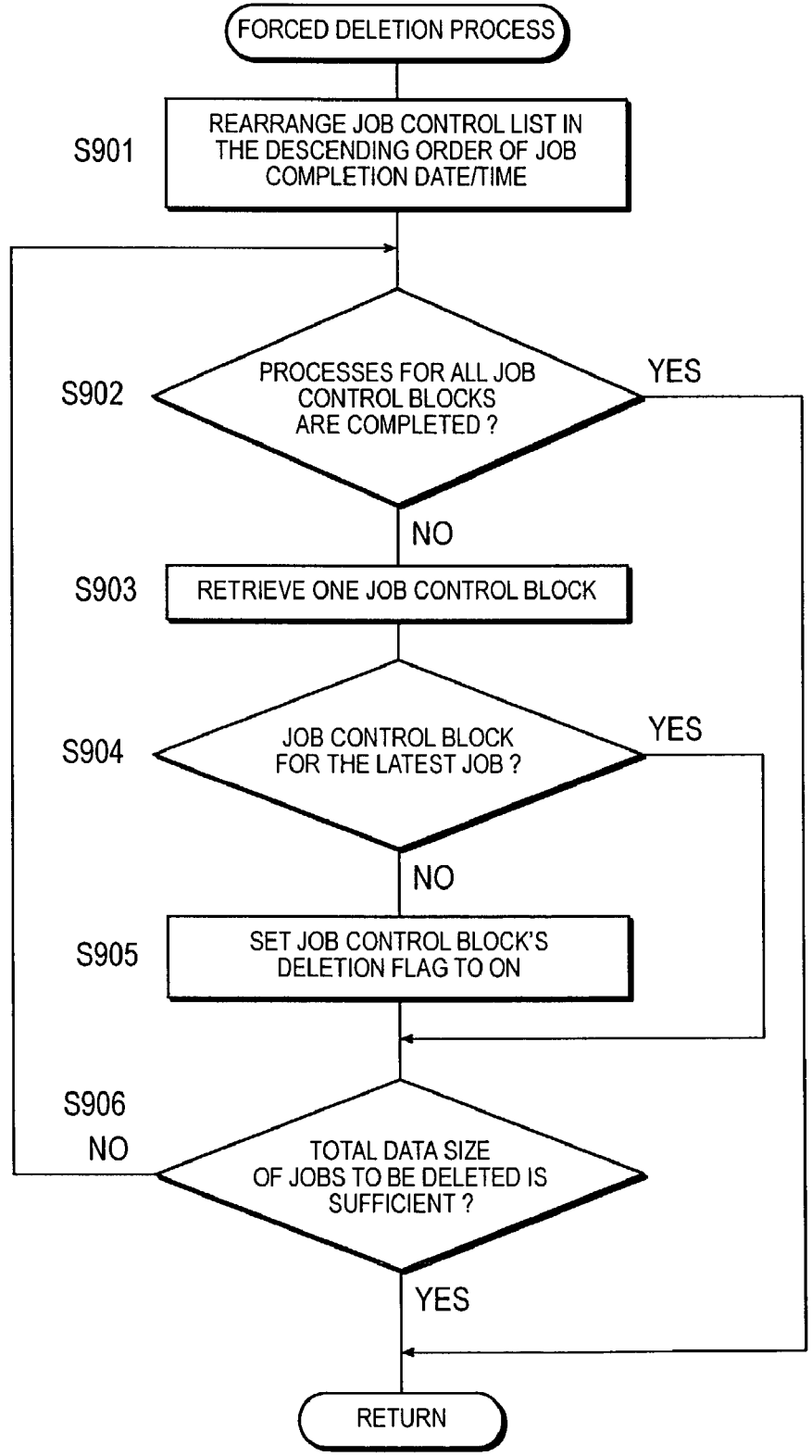
FIG. 16 is a flow chart for describing a forced deletion process.

Next, the forced deletion process of the step S806 shown in FIG. 15 will be described below with reference to FIG. 16.

First, job control blocks in the job control list are rearranged in the descending order of job completion date/time (S901). However, it is also possible to arrange "referencing jobs" that obtain image data by referencing "referenced jobs," or "referenced jobs" containing image data that are referenced by "referencing jobs," in the rear portion of the job control list.

Next, a judgment is made as to whether the processes for all the job control blocks are completed (S902). When the processes for all the job control blocks are completed (S902: Yes), the system returns to the flow chart of FIG. 15.

On the other hand, if the processes for all the job control blocks are not completed (S902: No), one job control block is retrieved (S903). Here the rearrange job control blocks are retrieved one by one from the leading block.

A judgment is made here as to whether the retrieved job control block in question is the job control block for the latest job immediately after the job execution (S904).

If it is not the job control block for the latest job (S904: No), the deletion flag in the job control block is set to ON (S905). On the other hand, if it is the job control block for the latest job (S904: Yes), the system advances to the step S906.

In the step S906, a judgment is made as to whether the total data size of the jobs to be deleted by setting the deletion flag to ON forcibly in the step S905 is sufficient for securing a specified vacant space on the hard disk. Here the specified vacant space is set in such a way as to make the ratio of the hard disk's usage amount against its total capacity to be lower (e.g., 70%) than the threshold value (e.g., 90%) in the step S805. This prevents the forced deletion processes from occurring frequently.

If the total data size of the jobs to be deleted is not sufficient (S906: No), the system returns to the step S902. On the other hand, if the total data size of the jobs to be deleted is sufficient (S906: Yes), the system returns to the flow chart shown in FIG. 15.

Figure 17:
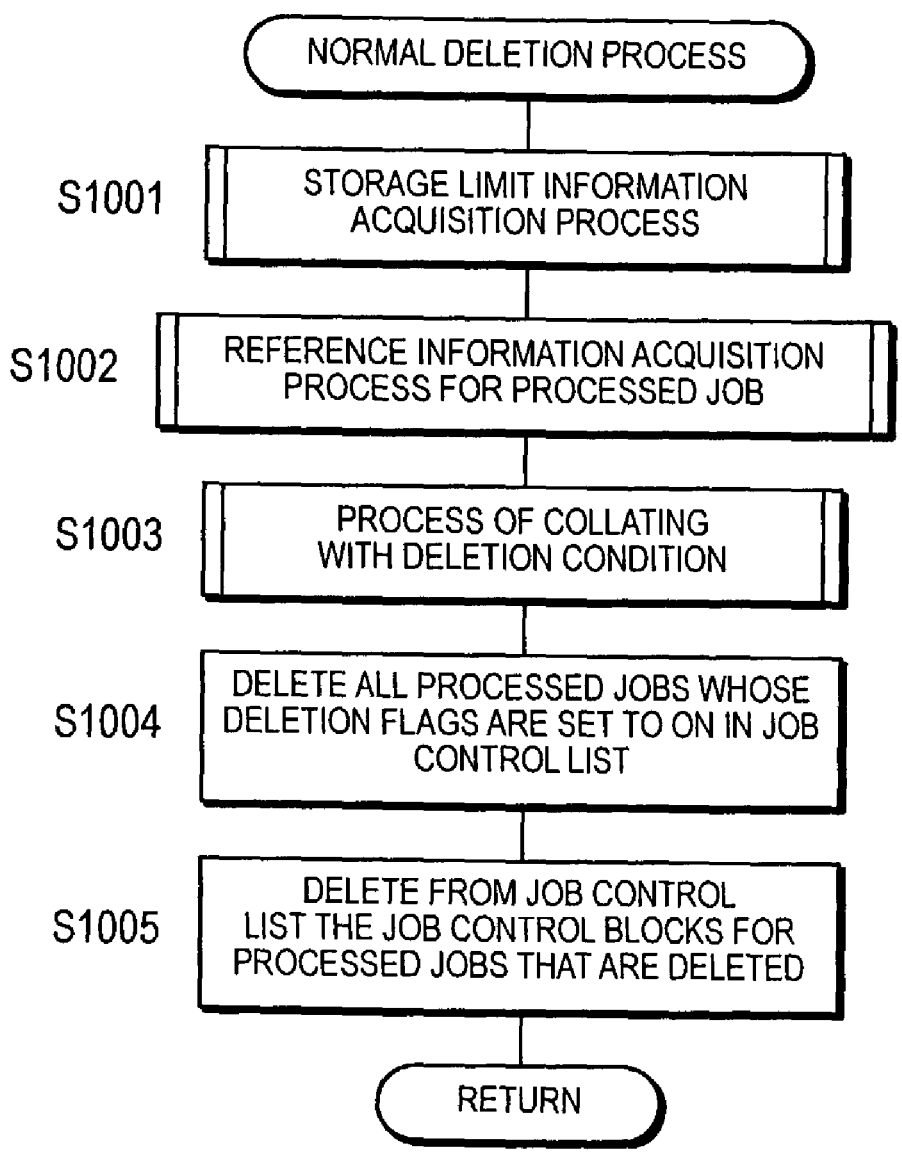
FIG. 17 is a flow chart for describing a normal deletion process.

Next, the normal deletion process of the step S807 shown in FIG. 15 will be described below with reference to FIG. 17.

First, a storage limit information acquisition process is performed in order to set the time limit flag ON in the job control block concerning a processed job that has reached its storage limit (S1001). The detail of the storage limit information acquisition process will be described later.

Next, a reference information acquisition process for a processed job in order to set the reference flag to OFF in the job control block concerning the job in the reference relation (S1002). The detail of the reference information acquisition process for the processed job will be described later.

A process of collating with deletion condition is performed in order to set the deletion flag to ON in the job control block related to a job that meets the deletion condition due to normal reasons such as reaching the storage limit (S1003). The detail of this process for collating with the deletion condition will be described later.

In the step S1004, all of the processed jobs whose deletion flags are set to ON in the job control list are deleted from the hard disk of the storage unit 202. In other words, the deletions of the processed jobs are done together with the deletions of the jobs whose deletion flags are set to ON (see S905) in the forced deletion process.

Next, the job control blocks for the processed jobs deleted in the step S1004 are deleted from the job control list (S1005).

Figure 18:
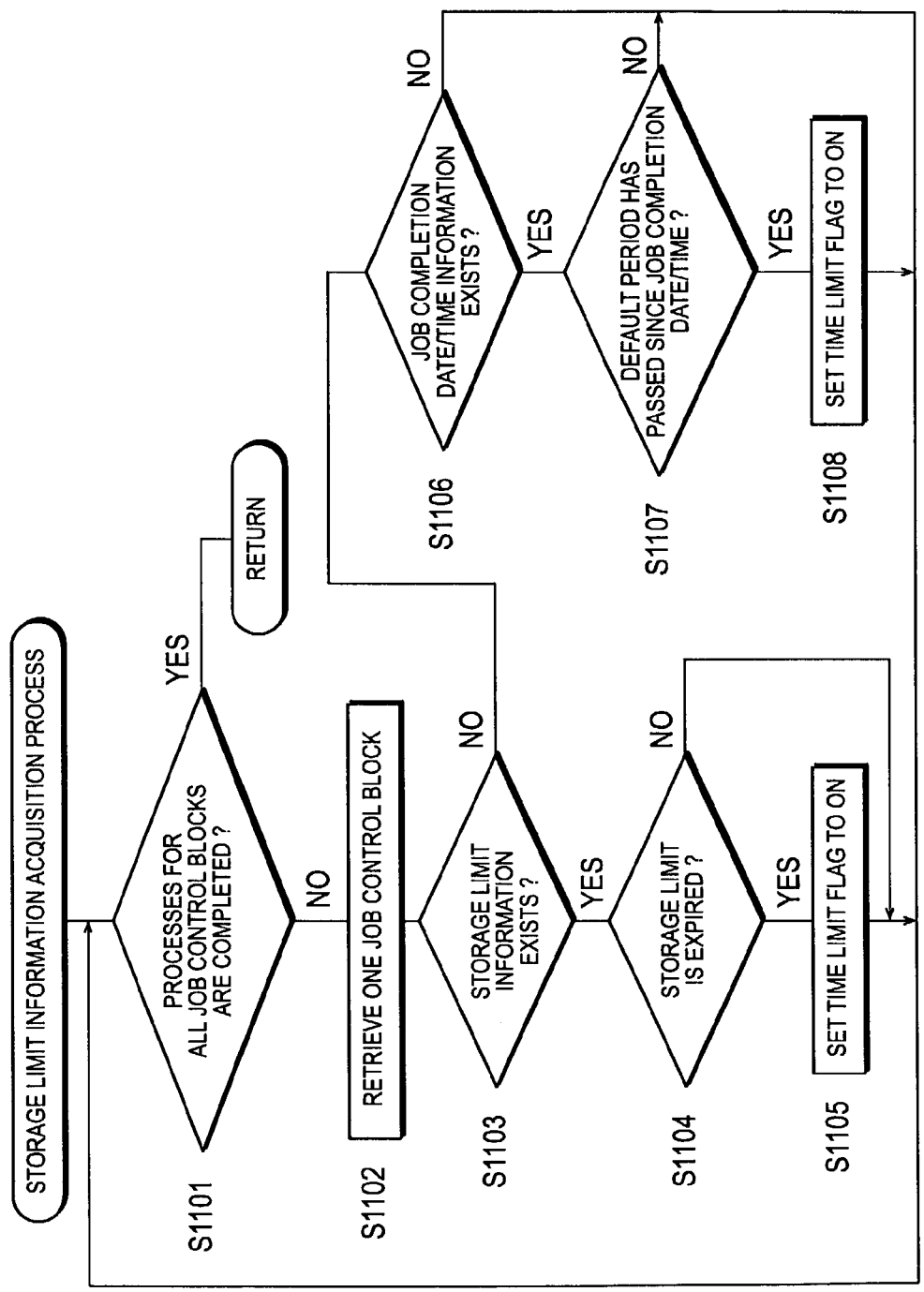
FIG. 18 is a flowchart for describing a storage limit information acquisition process.

Next, the storage limit information acquisition process of the step S1001 shown in FIG. 17 will be described below with reference to FIG. 18.

First, a judgment is made as to whether the processes for all the job control blocks are completed (S1101).

If the processes for all the job control blocks are not completed (S1101: No), one job control block is retrieved (S1102). At this point, the job control blocks are taken out one by one, for example, in the order of the job numbers.

Next, a judgment is made as to whether any storage limit information exists in the retrieved job control block in question (S1103).

If it has storage limit information (S1103: Yes), a judgment is made as to whether the storage limit has expired based on the storage limit information, i.e., whether it does not meet the time limit condition for storage any longer (S1104). If the storage limit has been expired (S1104: Yes), the time limit flag in the job control block in question is set to ON (S1105), and the system returns to the step S1101. If the storage limit has not been expired (S1104: No), the time limit flag in the job control block in question remains OFF (default), and the system returns to the step S1101.

If it is judged that no storage limit information exists in the step S1103 (S1103: No), a judgment is made as to whether any job completion date/time information exists in the job control block in question (S1106).

If there is job completion date/time information (S1106: Yes), a judgment is made as to whether the default storage period has passed since the job completion date/time based on the job completion date/time information, i.e., whether it no longer meets the time limit condition for storage (S1107). If the storage period has passed since the job completion date/time (S1107: Yes), the time limit flag in the job control block in question is set to ON (S1108), and the system returns to the step S1101. On the other hand, if no job completion date/time information exists (S1106: No), or the storage period has not passed since the job completion date/time (SI 107: No), the time limit flag in the job control block in question remains OFF (default value), and the system returns to the step S1101.

The above process is repeated until the processes for all the job control blocks are completed (S1101: Yes).

Figure 19:
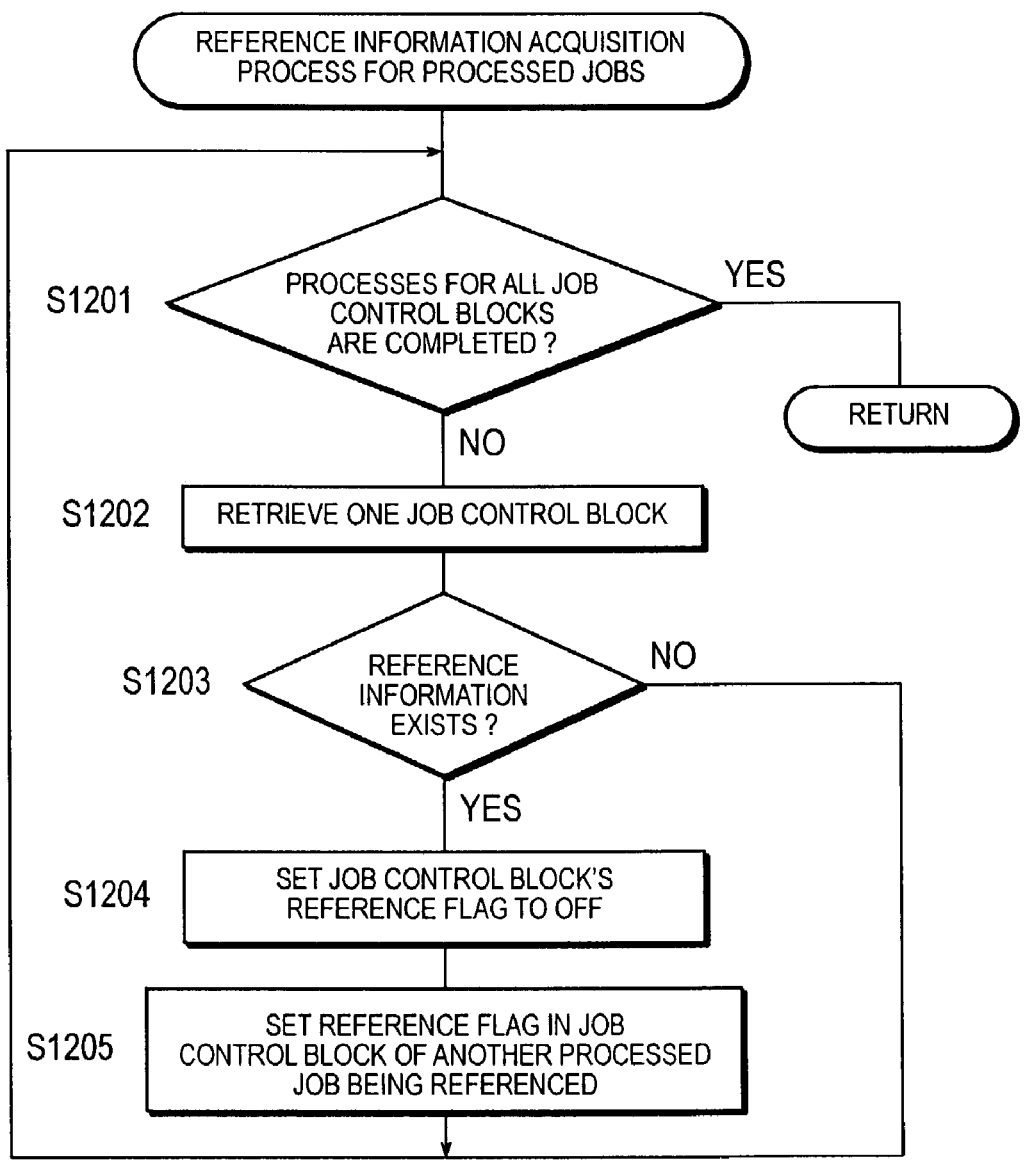
FIG. 19 is a flowchart for describing a reference information acquisition process for a processed job.

Next, the reference information acquisition process for the processed jobs of the step S1002 shown in FIG. 17 will be described below with reference to FIG. 19.

First, a judgment is made as to whether the processes for all the job control blocks are completed (S1201).

If the processes for all the job control blocks are not completed (S1201: No), one job control block is retrieved (S1202).

Next, a judgment is made as to whether any reference information exists in the retrieved job control block in question (S1203).

If reference information exists (S1203: Yes), the reference flag in the job control block in question is set to OFF (S1204). Also, the reference flag in the job control block concerning another processed job to which the own job is referencing is set to OFF based on the reference information (S1205), and the system returns to the step S1201. The step S1204 can be skipped. However, considering the fact that a reproduced or combined job's data size is relatively small, and that the importance is relatively high as it has a referencing relation, it is preferable that both the steps S1204 and 1205 are executed as shown in FIG. 19. The order of execution of the steps S1204 and S1205 can be reversed.

If the no reference information exists (S1203: No), the reference flag in the job control block in question remains ON (default), and the system returns to the step S1201.

The above process is repeated until the processes for all the job control blocks are completed (S1201: Yes).

Figure 20:
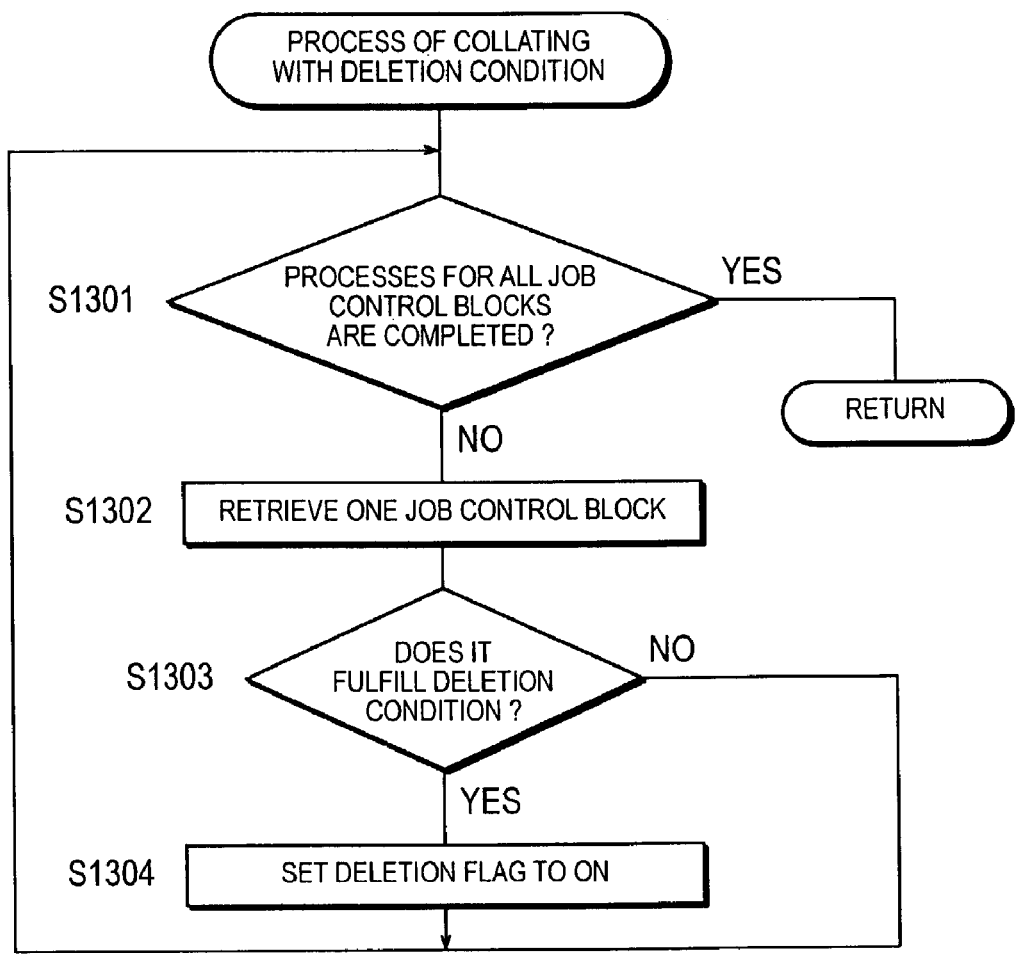
FIG. 20 is a flowchart for describing a process of collating with deleting conditions.

Next, the process of collating with deletion condition in the step S1003 shown in FIG. 17 will be described below with reference to FIG. 20 and FIG. 21.

First, a judgment is made as to whether the processes for all the job control blocks are completed (S1301).

If the processes for all the job control blocks are not completed (S1301: No), one job control block is retrieved (S1302).

Next, a judgment is made as to whether the deletion condition is met due to normal reasons such as the storage limit expiration, based on the information concerning the contents of the retrieved job control block in question and the information related to the job corresponding to the job control block in question (S1303).

If the deletion condition is met (S1303: Yes), the deletion flag in the job control block in question is set to ON (S1304), and the system returns to the step S1301.

FIG. 21 is a diagram showing a deletion condition. As shown in FIG. 21, if the reference flag and time limit flag are ON and the job that corresponds to the job control block in question has a job-common header and is not the latest job, it is judged that it meets the deletion condition, so that the deletion flag in the job control block in question becomes ON as a result. Regardless of whether the time limit flag in ON or OFF, the same result is achieved if the reference flag is ON and the job that corresponds to the job control block in question has the deletion scheduled job-common header and is not the latest job.

On the other hand, if the deletion condition is not met (S1303: No), the deletion flag in the job control block in question remains OFF (default), and the system returns to the step S1301.

The above process is repeated until the processes for all the job control blocks are completed (S1301: Yes).

As can be seen from the above description, the server that functions as the image data control device according to this embodiment is capable of achieving a more effective and appropriate use of the storage device for accumulating jobs containing image data.

More specifically, the server 200 stores image data based on input information into the hard disk of the storage unit 202, reads sequentially the image data stored in the hard disk sequentially, and detects the usage status of the hard disk in the course of reading the image data. Based on the detection result of the usage status of the hard disk, it provides control for deleting from the hard disk at least a portion of the image data, which has already been read, among image data being read. Therefore, it is possible to execute a job being entered with a large data size without losing jobs containing image data already stored in the hard disk of the storage unit 202.

The server 200 also makes a judgment as to whether a job containing image data stored in the hard disk of the storage unit 202 is designated to be deleted from the hard disk. Then, among the jobs judged to have been designated to be deleted, it provides control for saving those "referenced jobs" containing image data that are referenced by reproduced or combined jobs ("referencing jobs") from deletion from the hard disk. Therefore, even if the jobs referenced by reproduced or combined jobs are designated to be deleted, it is possible to maintain the storage condition leaving the "referenced jobs"

intact, thus avoiding a situation of the reason for existence of the reproduced or combined jobs being eliminated.

It is obvious that this invention is not limited to the particular embodiments shown and described above but may be variously changed and modified without departing from the technical concept of this invention.

For example, although the above embodiment is described as a MFP based on a PC consisting of a combination of an image forming device such as a copying machine, a printer and a scanner, and the image data control device such as a server capable of controlling the image forming device, provided as two independent devices, the invention is not limited to such a constitution. The invention can, of course, be applied to a single image forming device such as an MFP that contains the function of an image data control device such as a server integrally built therein.

The means of conducting various processes in the image data control device can be realized by means of a dedicated hardware circuit, or a programmed computer. The program can be provided either by a computer readable recording medium such as a flexible disk and a CD-ROM, or by being supplied on-line via a network such as the Internet. In this case, the program recorded on the computer readable recording medium is normally transferred to and stored in a storage device such as a hard disk. The program can also be provided as independent application software or can be built into the software of the computer as a part of its function.

What is claimed is:

1. An image data control device comprising:
   a nonvolatile storage device for sequentially storing an input job including image data having plural pages of images divided by page;
   a reader for sequentially reading the image data and writing the image data onto a volatile memory from the nonvolatile storage device;
   a detector for detecting said nonvolatile storage device's usage status whenever a page of the image data is read from the nonvolatile storage device;
   a controller for providing control for deleting from said nonvolatile storage device one page of the page images, which was read immediately before a page that was last read, among the image data, when it is judged that said nonvolatile storage device's usage amount has exceeded a specified usage limit based on said detector's detection result; and
   a job deletion unit for deleting a specified job, which is already stored in the nonvolatile storage device, from said nonvolatile storage device, when it is judged that said nonvolatile storage device's usage amount has exceeded a specified usage limit after executing the input job.

2. An image data control device as claimed in claim 1, wherein said image data contains multiple page images, which are divided by page;
   said detector detects said nonvolatile storage device's usage condition each time when a page of page image is read; and
   said controller provides control for deleting from said nonvolatile storage device all page images, which have already been read, among the image data being read.

3. A computer readable recording medium having recorded thereon an image data control program that causes a computer to execute a process comprising the steps of:
   1) sequentially reading image data having plural pages of images divided by page that is sequentially stored into a nonvolatile storage device and writing the image data onto a volatile memory from the nonvolatile storage device;
   2) detecting said storage device's usage status whenever a page of the image data is read from the nonvolatile storage device;
   3) providing control for deleting from said nonvolatile storage device one page of the page images, which was read immediately before a page that was last read among the image data being read, when it is judged that said nonvolatile storage device's usage amount has exceeded a specified usage limit based on detection result in step 2); and
   deleting a specified job, which is already stored in the nonvolatile storage device, from said nonvolatile storage device, when it is judged that said nonvolatile storage device's usage amount has exceeded a specified usage limit after executing the input job.

4. A computer readable recording medium having recorded thereon an image data control program as claimed in claim 3, wherein said image data contains multiple page images, which are divided by page;
   in step 2), said nonvolatile storage device's usage status is detected each time when a page of page image is read; and
   in step 3), said control is provided for deleting from said nonvolatile storage device all page images, which have already been read, among the image data being read.

5. An image forming device comprising:
   a nonvolatile storage device for sequentially storing an input job including image data having plural pages of images divided by page;
   a reader for sequentially reading the image data and writing the image data onto a volatile memory from the nonvolatile storage device;
   a printing unit for printing the image data read by said reader;
   a detector for detecting said nonvolatile storage device's usage status in the course of reading a page image data from the nonvolatile storage device;
   a controller for providing control for deleting from said nonvolatile storage device one page of the pages images, which was read immediately before a page that was last read, among the image data, when it is judged that said nonvolatile storage device's usage amount has exceeded a specified usage limit based on said detector's detection result; and
   a job deletion unit for deleting a specified job, which is already stored in the storage device, from said nonvolatile storage device, when it is judged that said nonvolatile storage device's usage amount has exceeded a specified usage limit after executing the input job.

6. An image forming device as claimed in claim 5, wherein said image data contains multiple page images, which are divided by page;
   said detector detects said nonvolatile storage device's usage status each time when a page of page image is read; and
   said controller provides control for deleting from said nonvolatile storage device all page images, which have already been read, among the image data being read.

7. An image reading device comprising:
   a scanner for scanning a document;
   a nonvolatile storage device for sequentially storing an input job including image data having plural pages of images divided by page;

a reader for sequentially reading the image data and writing the image data onto a volatile memory from the nonvolatile storage device;

a transmitter for transmitting the image data read by said reader;

a detector for detecting said nonvolatile storage device's usage status whenever a page of the image data is read from the nonvolatile storage device;

a controller for providing control for deleting from said storage device one page of the page images, which was read immediately before a page that was last read, among the image data, when it is judged that said nonvolatile storage device's usage amount has exceeded a specified usage limit based on said detector's detection result; and a job deletion unit for deleting a specified job, which is already stored in the storage device, from said nonvolatile storage device, when it is judged that said nonvolatile storage device's usage amount has exceeded a specified usage limit after executing the input job.

8. An image reading device as claimed in claim 7, wherein said image data contains multiple page images, which are divided by page;

said detector detects said nonvolatile storage device's usage status each time when a page of page image is read; and said controller provides control for deleting from said nonvolatile storage device all page images, which have already been read, among the image data being read.

9. An image data control device as claimed in claim 1, wherein said controller provides control for deleting from said nonvolatile storage device less than all of the pages, which have already been read, among the image data, when it is judged that said nonvolatile storage device's usage amount has exceeded a specified usage limit based on said detector's detection result.

10. An image data control device as claimed in claim 1, wherein said controller provides control for deleting from said nonvolatile storage device at least a portion of the page images, which have already been read, among the image data, when it is judged that said nonvolatile storage device's usage amount has exceeded a specified usage limit based on said detector's detection result during the reading of an input job.

11. A computer readable recording medium having recorded thereon an image data control program as claimed in claim 3, wherein said providing control includes providing control for deleting from said nonvolatile storage device less than all of the pages, which have already been read, among the image data, when it is judged that said nonvolatile storage device's usage amount has exceeded a specified usage limit based on said detector's detection result.

12. A computer readable recording medium having recorded thereon an image data control program as claimed in claim 3, wherein said providing control includes providing control for deleting from said nonvolatile storage device at least a portion of the page images, which have already been read, among the image data, when it is judged that said nonvolatile storage device's usage amount has exceeded a specified usage limit based on said detector's detection result during the reading of an input job.

13. An image forming device as claimed in claim 5, wherein said controller provides control for deleting from said nonvolatile storage device less than all of the pages, which have already been read, among the image data, when it is judged that said nonvolatile storage device's usage amount has exceeded a specified usage limit based on said detector's detection result.

14. An image forming device as claimed in claim 5, wherein said controller provides control for deleting from said nonvolatile storage device at least a portion of the page images, which have already been read, among the image data, when it is judged that said nonvolatile storage device's usage amount has exceeded a specified usage limit based on said detector's detection result during the reading of an input job.

15. An image reading device as claimed in claim 7, wherein said controller provides control for deleting from said nonvolatile storage device less than all of the pages, which have already been read, among the image data, when it is judged that said nonvolatile storage device's usage amount has exceeded a specified usage limit based on said detector's detection result.

16. An image reading device as claimed in claim 7, wherein said controller provides control for deleting from said nonvolatile storage device at least a portion of the page images, which have already been read, among the image data, when it is judged that said nonvolatile storage device's usage amount has exceeded a specified usage limit based on said detector's detection result during the reading of an input job.

17. An image data control device as claimed in claim 1, comprising;

an acquiring unit for acquiring reference information for executed jobs of image data that is referenced by other jobs; and a control unit for cancelling deletion of the executed job, if it is determined that the executed job contains image data that is referenced by other jobs.

* * * * *